(12) United States Patent
Konig et al.

(10) Patent No.: US 10,839,432 B1
(45) Date of Patent: Nov. 17, 2020

(54) SYSTEMS AND METHODS FOR AUTOMATING CUSTOMER INTERACTIONS WITH ENTERPRISES

(71) Applicant: GENESYS TELECOMMUNICATIONS LABORATORIES, INC., Daly City, CA (US)

(72) Inventors: Yochai Konig, San Francisco, CA (US); Ron Harlev, San Francisco, CA (US); Javier Villalobos, San Pablo, CA (US); James Hvezda, Toronto (CA); Archana Sekar, Chennai (IN)

(*) Notice: Subject to any disclaimer, the term of this patent is extended or adjusted under 35 U.S.C. 154(b) by 0 days.

(21) Appl. No.: 16/392,455

(22) Filed: Apr. 23, 2019

Related U.S. Application Data

(63) Continuation-in-part of application No. 16/151,362, filed on Oct. 4, 2018, which is a continuation-in-part of application No. 14/201,648, filed on Mar. 7, 2014, now abandoned.

(60) Provisional application No. 62/686,077, filed on Jun. 17, 2018.

(51) Int. Cl.
*G06Q 30/02* (2012.01)
*G06Q 30/00* (2012.01)

(52) U.S. Cl.
CPC ....... *G06Q 30/0281* (2013.01); *G06Q 30/016* (2013.01)

(58) Field of Classification Search
CPC .............. G06Q 30/0281; G06Q 30/016; H04L 51/046; H04M 3/5183
USPC .................................................. 379/265.09
See application file for complete search history.

(56) References Cited

U.S. PATENT DOCUMENTS

| | | |
|---|---|---|
| 6,134,530 A | 10/2000 | Bunting et al. |
| 8,484,031 B1 | 7/2013 | Yeracaris et al. |
| 8,670,987 B2 | 3/2014 | Bergl et al. |
| 2002/0059164 A1 | 5/2002 | Shtivelman |
| 2002/0143961 A1 | 10/2002 | Siegel et al. |
| 2002/0196679 A1 | 12/2002 | Lavi et al. |

(Continued)

OTHER PUBLICATIONS

Meng, Lian et al., Dialogue Intent Classification with Long Short-Term Memory Networks, National CCF Conference on Natural Language Processing and Chinese Computing. 2017, Springer, pp. 42-50.

(Continued)

*Primary Examiner* — Ahmad F. Matar
*Assistant Examiner* — Jirapon Intavong

(57) ABSTRACT

A method for automating interactions with enterprises includes: receiving, through a user interface, a natural language request from a customer; determining a customer intent from the natural language request; conducting an automated interaction by: determining, by a personal bot controller circuit, an enterprise to service the customer intent; loading an enterprise library for interacting with an application programming interface (API) of the enterprise, the enterprise library including one or more library functions; identifying a library function for servicing the customer intent from among the one or more library functions; generating a request based on the identified library function and the customer intent; transmitting the generated request to the enterprise to initiate an interaction; receiving a response from the enterprise; and notifying the customer of a result of the interaction.

16 Claims, 10 Drawing Sheets

(56) References Cited

U.S. PATENT DOCUMENTS

| | | |
|---|---|---|
| 2004/0249650 A1 | 12/2004 | Freedman et al. |
| 2006/0150119 A1 | 7/2006 | Chesnais et al. |
| 2006/0271351 A1 | 11/2006 | Mirkovic et al. |
| 2009/0245500 A1 | 10/2009 | Wampler |
| 2013/0268260 A1 | 10/2013 | Lundberg |
| 2017/0180284 A1* | 6/2017 | Smullen ................ H04L 67/322 |
| 2017/0324867 A1 | 11/2017 | Tamblyn et al. |
| 2018/0337872 A1 | 11/2018 | Fawcett |
| 2019/0182382 A1 | 6/2019 | Mazza et al. |

OTHER PUBLICATIONS

Nadeau, David et al., A survey of named entity recognition and classification. Lingvisticae Investigationes 30.1 (2007), 20 pages.

Swagger-api/swagger-codegen, swagger-codegen/README.md.

13 Text classification and Naïve Bayes, Online edition (c) 2009 Cambridge UP, pp. 253-287.

International Search Report and Written Opinion dated Jul. 30, 2019, in related PCT Application PCT/US2019/037435, International Filing Date Jun. 17, 2019.

International Search Report and Written Opinion dated Aug. 22, 2019, in related PCT Application PCT/US2019/037429, International Filing Date Jun. 17, 2019.

International Search Report and Written Opinion dated Aug. 21, 2019, in related PCT Application PCT/US2019/037420, International Filing Date Jun. 17, 2019.

PCT International Preliminary Report on Patentability received Mar. 30, 2020 in related PCT application PCT/US2019/037435.

PCT International Preliminary Report on Patentability received Apr. 6, 2020 in related PCT application PCT/US2019/037429.

PCT Chapter II Preliminary Report on Patentability for co-pending application No. PCT/US2019/037420 dated Jun. 25, 2020.

* cited by examiner

SYSTEMS AND METHODS FOR AUTOMATING CUSTOMER INTERACTIONS WITH ENTERPRISES

CROSS-REFERENCE TO RELATED APPLICATION(S)

This application is a continuation-in-part of U.S. patent application Ser. No. 16/151,362, filed Oct. 4, 2018, which claims the benefit of U.S. Provisional Patent Application No. 62/686,077 "SYSTEM AND METHOD FOR CUSTOMER EXPERIENCE AUTOMATION," filed in the United States Patent and Trademark Office on Jun. 17, 2018, and U.S. patent application Ser. No. 16/151,362 is a continuation-in-part of U.S. patent application Ser. No. 14/201,648, "CONVERSATION ASSISTANT," filed in the United States Patent and Trademark Office on Mar. 7, 2014, the entire disclosures of which are incorporated by reference herein.

FIELD

Aspects of embodiments relate to the field of automated agents, such as systems and methods for automating interactions between customers and enterprises.

BACKGROUND

When customers interact with large organizations such as companies or, more generally, "enterprises," they generally communicate with contact center agents through voice communications channels such as telephone calls or text communications channels such as web-based chat. Some enterprises also provide self-service options, such as interactive voice response (IVR) systems that operate over voice communications channels and interactive websites. For example, an airline company may offer customers a variety of ways to purchase tickets. Customers may purchase plane tickets by calling an airline to speak with a sales agent and providing payment information over the telephone. Customers may alternatively use the airline's website to search for flights and enter payment information through a form in the web browser.

Some enterprises provide automated systems for these interactions, such as computer programs (generally, a "chatbot") configured to conduct conversations with humans over text chat or voice in order to provide information and/or to perform certain services. For example, a chatbot for a bank may be able to answer questions such as the location of the nearest automated teller machine (ATM), the operating hours of the nearest branch, or the status of a credit card payment, and perform tasks such as paying bills from a third party.

Some of these interactions typically involve the repetition of standard information, such as a user's personal information (e.g., name, address, and seat preference), account information (e.g., credit card information, username and password, mother's maiden name, and social security number), etc. Interacting with contact centers of organizations in this way may also require customers to wait extended periods of time for an agent to become available. Furthermore, these communication channels are generally restricted to voice or text-based communications, thereby constraining the ability of the two parties to communicate and to resolve the customer's issue.

SUMMARY

Aspects of embodiments relate to systems and methods for automating customer interactions with enterprises. Some aspects of embodiments relate to determining a customer intent from a natural language input supplied by the customer and automatically interacting with an enterprise on behalf of the user to realize the customer intent.

According to one embodiment, a system for automating interactions with enterprises includes: a user interface configured to receive a natural language request from a customer; a natural language processing engine executed by a processor and configured to determine a customer intent from the natural language request; a personal bot controller circuit configured to conduct an automated interaction by: determining an enterprise to service the customer intent; loading an enterprise library for interacting with an application programming interface (API) of the enterprise, the enterprise library including one or more library functions; identifying a library function for servicing the customer intent from among the one or more library functions; generating a request based on the identified library function and the customer intent; transmitting the generated request to the enterprise to initiate an interaction; receiving a response from the enterprise; and notifying the customer of a result of the interaction.

The personal bot controller circuit may be configured to generate the request by: identifying one or more arguments to the identified library function, each of the arguments being tagged with a description; for each argument of the one or more arguments: determining whether data in the natural language request matches the description corresponding to the argument; and in response to determining that the natural language request includes data matching the description, adding the matching data to the request as a value of the argument; and generating the request by inserting the matching data into a request payload.

The system may further include a customer profile storage module, wherein the personal bot controller circuit may further be configured to generate the request by, when the natural language request does not include data matching the description: searching the customer profile storage module for data matching the description; and in response to determining that the customer profile storage module includes data matching the description, adding the matching data to the request as the value of the argument.

The personal bot controller circuit may further be configured to generate the request by, when the natural language request does not include data matching the description: prompting the customer, via the user interface, to input data matching the description; and adding the data input by the customer to the request as the value of the argument.

The personal bot controller circuit may further be configured to generate the request by, when the natural language request does not include data matching the description: searching for data matching the description in an external service associated with the customer, the external service being accessed using a second enterprise library; and in response to determining that the external service includes data matching the description: retrieving the matching data from the external service using the second enterprise library; and adding the matching data from the external service to the request as the value of the argument.

The personal bot controller circuit may further be configured to conduct an automated interaction by: determining whether the response from the enterprise indicates that the interaction is complete; in response to determining that the interaction is complete, determining the result of the interaction based on the response from the enterprise; in response to determining that the interaction is not complete: identifying a second library function from the enterprise library for responding to the enterprise; generating a follow up request based on the response from the enterprise; and transmitting the follow up request to the enterprise.

The response from the enterprise may include a list of options, and wherein the generating the follow up request may include: displaying the list of options on the user interface; and receiving a user selection from the list of options.

The enterprise library may be generated by: loading published documentation associated with the API of the enterprise; parsing the published documentation to identify a plurality of API functions, the published documentation including: a description of each of the API functions, and one or more parameters for each of the API functions, each of the one or more parameters being associated with a description; generating the library functions from corresponding ones of the API functions and the associated descriptions of the API functions, each of the library functions being generated from a corresponding one of the API functions by: storing an API endpoint for the corresponding API function; storing the description of the corresponding API function; identifying the one or more parameters of the corresponding API function; and storing the one or more descriptions of the one or more parameters of the corresponding API function.

Each of the one or more library functions of the enterprise library may be associated with a description, and the identifying the library function for servicing the customer intent may include identifying a library function having a corresponding description that is most semantically similar to the customer intent.

The enterprise library may be generated by: loading published documentation associated with the API of the enterprise; parsing the published documentation to identify a plurality of API functions, the published documentation including a description of each of the API functions; and generating each of the one or more library functions from corresponding ones of the API functions and the corresponding descriptions of the API functions.

According to one embodiment, a method for automating interactions with enterprises includes: receiving, through a user interface, a natural language request from a customer; determining a customer intent from the natural language request by supplying the natural language request to a natural language processing engine; conducting an automated interaction by: determining, by a personal bot controller circuit, an enterprise to service the customer intent; loading, by the personal bot controller circuit, an enterprise library for interacting with an application programming interface (API) of the enterprise, the enterprise library including one or more library functions; identifying, by the personal bot controller circuit, a library function for servicing the customer intent from among the one or more library functions; generating, by the personal bot controller circuit, a request based on the identified library function and the customer intent; transmitting, by the personal bot controller circuit, the generated request to the enterprise to initiate an interaction; receiving, by the personal bot controller circuit, a response from the enterprise; and notifying, by the personal bot controller circuit, the customer of a result of the interaction.

The generating the request may include: identifying one or more arguments to the identified library function, each of the arguments being tagged with a description; for each argument of the one or more arguments: determining whether data in the natural language request matches the description corresponding to the argument; and in response to determining that the natural language request includes data matching the description, adding the matching data to the request as a value of the argument; and generating the request by inserting the matching data into a request payload.

The generating the request may include, when the natural language request does not include data matching the description: searching a customer profile storage module for data matching the description; and in response to determining that the customer profile storage module includes data matching the description, adding the matching data to the request as the value of the argument.

The generating the request may include, when the natural language request does not include data matching the description: prompting the customer, via the user interface, to input data matching the description; and adding the data input by the customer to the request as the value of the argument.

The generating the request may include, when the natural language request does not include data matching the description: searching for data matching the description in an external service associated with the customer, the external service being accessed using a second enterprise library; and in response to determining that the external service includes data matching the description: retrieving the matching data from the external service using the second enterprise library; and adding the matching data from the external service to the request as the value of the argument.

The method may further include: determining whether the response from the enterprise indicates that the interaction is complete; in response to determining that the interaction is complete, determining the result of the interaction based on the response from the enterprise; in response to determining that the interaction is not complete: identifying a second library function from the enterprise library for responding to the enterprise; generating a follow up request based on the response from the enterprise; and transmitting the follow up request to the enterprise.

The response from the enterprise may include a list of options, and the generating the follow up request may include: displaying the list of options on the user interface; and receiving a user selection from the list of options.

The enterprise library may be generated by: loading published documentation associated with the API of the enterprise; parsing the published documentation to identify a plurality of API functions, the published documentation including: a description of each of the API functions, and one or more parameters for each of the API functions, each of the one or more parameters being associated with a description; generating the library functions from corresponding ones of the API functions and the associated descriptions of the API functions, each of the library functions being generated from a corresponding one of the API functions by: storing an API endpoint for the corresponding API function; storing the description of the corresponding API function; identifying the one or more parameters of the corresponding API function; and storing the one or more descriptions of the one or more parameters of the corresponding API function.

Each of the one or more library functions of the enterprise library may be associated with a description, and the identifying the library function for servicing the customer intent may include identifying a library function having a corresponding description that is most semantically similar to the customer intent.

The enterprise library may be generated by: loading published documentation associated with the API of the enterprise; parsing the published documentation to identify a plurality of API functions, the published documentation including a description of each of the API functions; and generating each of the one or more library functions from corresponding ones of the API functions and the corresponding descriptions of the API functions.

BRIEF DESCRIPTION OF THE DRAWINGS

The accompanying drawings, together with the specification, illustrate exemplary embodiments, and, together with the description, serve to explain various principles.

DETAILED DESCRIPTION

Figure 1:
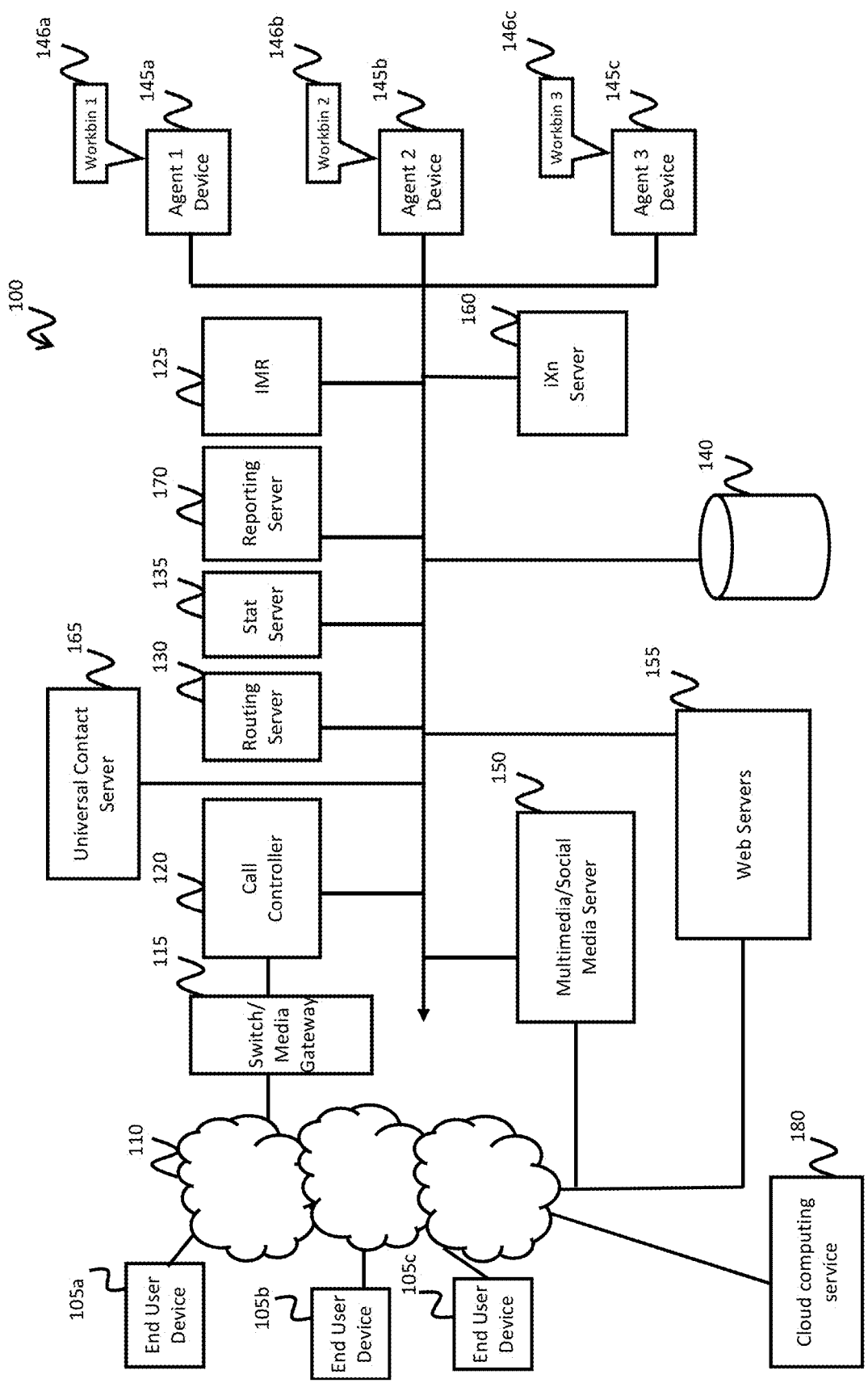
FIG. 1 is an embodiment of a system block diagram illustrating a system supporting a contact center.

In the following detailed description, only certain exemplary embodiments are shown and described, by way of illustration. As those skilled in the art would recognize, the invention may be embodied in many different forms and should not be construed as being limited to the embodiments set forth herein.

Aspects of embodiments relate to systems and methods for automating interactions between customers and enterprises. For example, some aspects of embodiments relate to an automated agent configured to interact with enterprises (e.g., companies) to achieve particular goals or results as requested by users (or "customers"). In current systems, customers must manually navigate the particular and potentially unique procedures and user interfaces for accomplishing particular goals with an organization. For example, different airline companies expose different web-based user interfaces to allow customers to search for and purchase plane tickets.

As one concrete example, a customer may have an issue with his cable internet service and communicate this issue to his personal agent (or "personal bot") by speaking or typing a natural language phrase such as: "My internet connection is down. Please contact the cable company for service." A natural language refers to a language used by humans to communicate with one another (e.g., English, Spanish, French, and Chinese), in contrast to artificial or constructed languages such as computer programming languages (e.g., C, Python, JavaScript, and assembly language). The personal bot then interacts with the appropriate company (in this case, the cable internet provider) on behalf of the customer to accomplish the customer's request (that is, to fix the problem). During the interaction, the personal bot may prompt the customer for additional information requested by the enterprise (e.g., a selection from a set of proposed appointment times for a technician to visit) if the personal bot does not have access to the information, or the personal bot may automatically respond to the question based on access to information (e.g., appointment times may be selected through a detection of available times in the customer's calendar and preferred times specified by the customer, either as part of the request, or as part of a standing general preference).

In some embodiments, the personal bot interacts with the enterprise through various interfaces provided by the enterprise, such as application programming interfaces (APIs) published by the enterprise and chatbots associated with the enterprise.

Some aspects of embodiments relate to the automatic discovery of enterprise application programming interfaces and the automatic generation of code (e.g., a "library") for interacting with a given API to accomplish a particular task. Some aspects of embodiments relate to the automatic generation of a library for interacting with a chatbot of a particular enterprise, in accordance with prior or current interactions with the chatbot.

Some aspects of embodiments will be described in the context of a mobile device application. In one embodiment, the application may be present on a mobile device, such as a smartphone or tablet computer. In various embodiments, aspects of methods of the invention may be performed by the application on the mobile device, a server of a cloud computing system, and/or combinations thereof. In some embodiments, the cloud computing system executing portions of the personal bot is independent of any particular enterprise with which the personal bot may interact.

Contact Center Overview

FIG. 1 is an embodiment of a schematic block diagram illustrating a system for supporting a contact center in providing contact center services, indicated generally at 100. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system 100 may also be distributed across various geographic locations and computing environments and not necessarily contained in a single location, computing environment, or even computing device.

Components of the communication infrastructure indicated generally at 100 may include, but not be limited to: a plurality of end user devices 105a, 105b, 105c; a communications network 110; a switch/media gateway 115; a call controller 120; an IMR server 125; a routing server 130; a stat server 135; a storage device 140; a plurality of agent devices 145a, 145b, 145c comprising workbins 146a, 146b

146c; a multimedia/social media server 150; web servers 155; an interaction (iXn) server 160; a universal contact server (UCS) 165; a reporting server 170; and media services 175.

In an embodiment, the contact center system 100 manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, video chats, social media posts, etc.) to the contact center via their end user devices 105a-105c (collectively referenced as 105). Each of the end user devices may include user input devices such as a microphone, a hardware keyboard, physical buttons, and/or a touch sensitive display (e.g., a touch screen). The end user devices may also include user interface components such as a display capable of showing text and images, and audio output components (e.g., a speaker, headphones, or digital or analog output systems) for playing sounds to the user. Examples of end user devices that may include both a microphone and a user input device include smart phones, tablet computers, laptop computers, and desktop computers. Users operating the end user devices 105 may initiate, manage, and respond to telephone calls, emails, chats, text messaging, web-browsing sessions, and other multi-media transactions. While three end user devices 105 are illustrated in the system 100 (FIG. 1) for simplicity, it is within the scope of the embodiments for any number may be present.

Inbound and outbound communications from and to the end user devices 105 may traverse a telephone, cellular, and/or data communication network 110 depending on the type of device that is being used. For example, the communications network 110 may include a private or public switched telephone network (PSTN), local area network (LAN), private wide area network (WAN), and/or public WAN such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, 5G, etc.

In an embodiment, the contact center system includes a switch/media gateway 115 coupled to the communications network 110 for receiving and transmitting telephony calls between end users and the contact center. The switch/media gateway 115 may include a telephony switch or communication switch configured to function as a central switch for agent level routing within the contact center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center.

The call controller 120 may be configured to process PSTN calls, VoIP calls, and the like. For example, the call controller 120 may be configured with computer-telephony integration (CTI) software for interfacing with the switch/media gateway and contact center equipment. In one embodiment, the call controller 120 may include a session initiation protocol (SIP) server for processing SIP calls.

According to some exemplary embodiments, the call controller 120 may, for example, extract data about the customer interaction such as the caller's telephone number (often known as the automatic number identification (ANI) number), or the customer's internet protocol (IP) address, or email address, and communicate with other contact center components in processing the interaction.

In an embodiment, the system further includes an IMR server 125, which may also be referred to as a self-help system, virtual assistant, or the like. The IMR server 125 may be similar to an IVR server, except that the IMR server 125 is not restricted to voice and may cover a variety of media channels, including voice and text chat (e.g., implementing a chatbot). Taking voice as an example, however, the IMR server 125 may be configured with an IMR script for querying customers on their needs. For example, a contact center for a bank may tell customers, via the IMR script, to "press 1" if they wish to get an account balance. If this is the case, through continued interaction with the IMR server 125, customers may complete service without needing to speak with an agent. The IMR server 125 may also ask an open-ended question such as, for example, "How can I help you?" and the customer may speak or otherwise enter a reason for contacting the contact center. The customer's response may then be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server (also refered to as a stat server) 135.

In some embodiments, the routing server 130 may query a customer database, which stores information about existing clients, such as contact information, service level agreement requirements, nature of previous customer contacts and actions taken by contact center to resolve any customer issues, etc. The database may be, for example, Cassandra or any NoSQL database, and may be stored in a mass storage device 140. The database may also be a SQL database and may be managed by any database management system such as, for example, Oracle, IBM DB2, Microsoft SQL server, Microsoft Access, PostgreSQL, MySQL, FoxPro, and SQLite. The routing server 130 may query the customer information from the customer database via an ANI or any other information collected by the IMR server 125.

Once an appropriate agent is identified as being available to handle a communication, a connection may be made between the customer and an agent device 145*a*-145*c* (collectively referenced as 145) of the identified agent. Collected information about the customer and/or the customer's historical information may also be provided to the agent device for aiding the agent in better servicing the communication. In this regard, each agent device 145 may include a telephone adapted for regular telephone calls, VoIP calls, etc. The agent device 145 may also include a computer for communicating with one or more servers of the contact center and performing data processing associated with contact center operations, and for interfacing with customers via voice and other multimedia communication mechanisms.

The contact center system may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. In this regard, the multimedia/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as, for example, Facebook, Twitter, Instagram, etc. In this regard, although in the embodiment of FIG. 1 the web servers 155 are depicted as being part of the contact center system 100, the web servers 155 may also be provided by third parties and/or maintained outside of the contact center premises. The web servers may also provide web pages for the enterprise that is being supported by the contact center. End users may browse the web pages and get information about the enterprise's products and services. The web pages may also provide a mechanism for contacting the contact center, via, for example, web chat (e.g., with a live agent and/or with a chatbot), voice call, email, WebRTC, etc.

The web servers 155 may also provide public facing application programming interfaces (APIs) for interacting with the contact center and/or enterprise. For example, the web servers may implement APIs in accordance with the Representational State Transfer (REST) architectural style (a "RESTful" web service), where request and response payloads may be transmitted in data formats such as Extensible Markup Language (XML) or JavaScript Object Notation (JSON). As another example, the web servers may implement APIs in accordance with markup languages and/or protocols such as the Web Services Description Language (WSDL) and Simple Object Access Protocol (SOAP), or using proprietary protocols.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 160 interacts with the routing server 130 for selecting an appropriate agent to handle the activity. Once assigned to an agent, an activity may be pushed to the agent, or may appear in the agent's workbin 146*a*-146*c* (collectively referenced as 146) as a task to be completed by the agent. The agent's workbin may be implemented via any data structure conventional in the art, such as, for example, a linked list, array, and/or the like. The workbin 146 may be maintained, for example, in buffer memory of each agent device 145.

According to one exemplary embodiment of the invention, the mass storage device(s) 140 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 140 or elsewhere. The mass storage device may take form of a hard disk or disk array as is conventional in the art.

According to some embodiments, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, and the like.

The contact center system 100 may also include a reporting server 170 configured to generate reports from data aggregated by the statistics server 135. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, etc).

The various servers of FIG. 1 may each include one or more processors executing computer program instructions and interacting with other system components for performing the various functionalities described herein. The computer program instructions are stored in a memory implemented using a standard memory device, such as, for example, a random-access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, social media messages, WebRTC calls, etc.

As noted above, the contact center may operate as a hybrid system in which some or all components are hosted remotely, such as in a cloud-based environment. For the sake of convenience, aspects of embodiments will be described below with respect to providing remotely hosted media services 175 in a cloud-based environment. In these examples, the media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting, to name some non-limiting examples.

In addition, the end user devices 105 and the various components of the contact center system 100 may communicate with a cloud computing service 180 (e.g., cloud computing services operated by a third party) over the communications network 110. Examples of cloud computing services 180 include infrastructure as a service (IaaS) and proprietary platforms providing various particular computing services such as data storage, data feeds, data synchronization, etc.

Figure 2A:
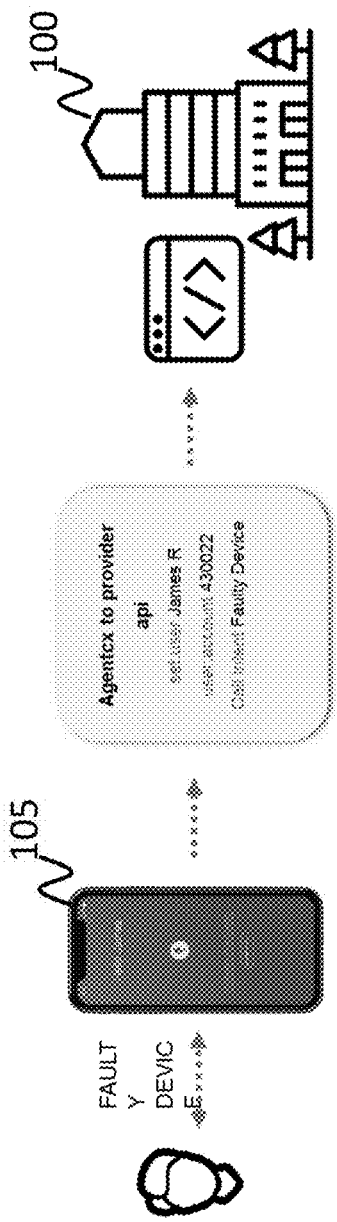
FIGS. 2A, 2B, 2C, 2D, and 2E depict an automated interaction between a personal bot according to one embodiment and an enterprise.
Figure 2B:
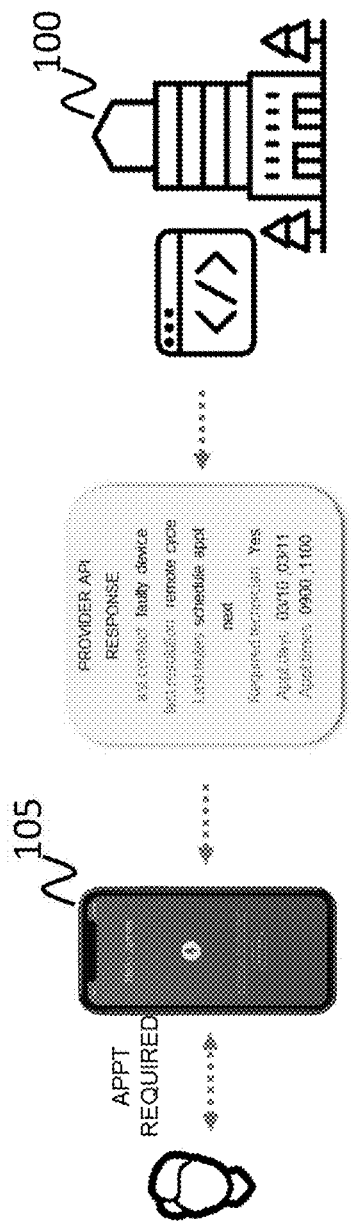

FIGS. 2A, 2B, 2C, 2D, and 2E depict an automated interaction between a personal bot according to one embodiment and an enterprise. Continuing the above example describing a customer seeking to have his internet connection repaired, FIG. 2A shows that the customer 205 speaks a request "FAULTY DEVICE" to the end user device 105. A personal bot in accordance with embodiments, with a user interface of the personal bot running on the end user device 105, sends a request 210 to a service provider or enterprise 215 (the cable company) using a provided-supplied application programming interface (API) 220. In the embodiment shown in FIG. 2A, the request 210 includes information such as the user name ("James R"), the user's account number ("430022") and the call intent or call reason ("Faulty Device"). The enterprise 215 receives the request via its API 220 and, as shown in FIG. 2B, generates a response 230. In the embodiment shown in FIG. 2B, the response 230 includes information such as the reason for the last contact ("faulty device"), the resolution of that interaction ("remote cycle"), and any notes on follow-up ("schedule apt. next." This information may be retrieved from data storage associated with the enterprise (e.g., information about the prior interactions stored in the mass storage device 140). Based on the information in the request and the information stored in the database, the enterprise 215 may determine that a technician is required to resolve the issue, and therefore the response includes a list of dates and times for an appointment for a technician to visit the customer's home.

Figure 2C:
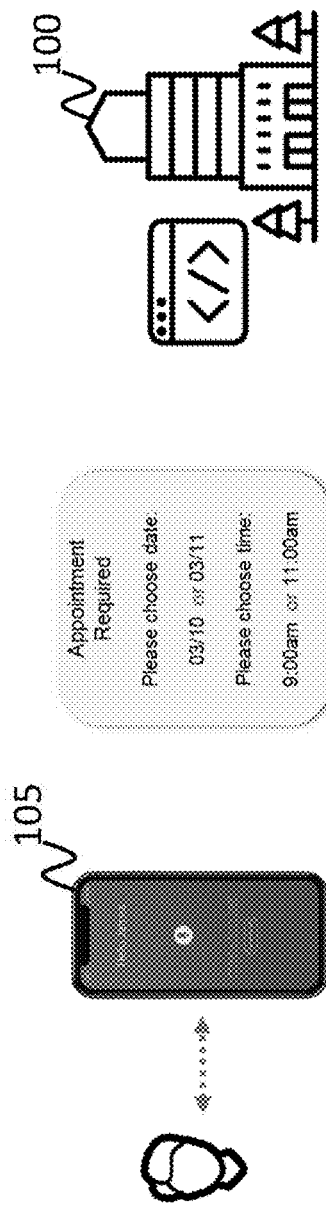
Figures 2D, 2E:
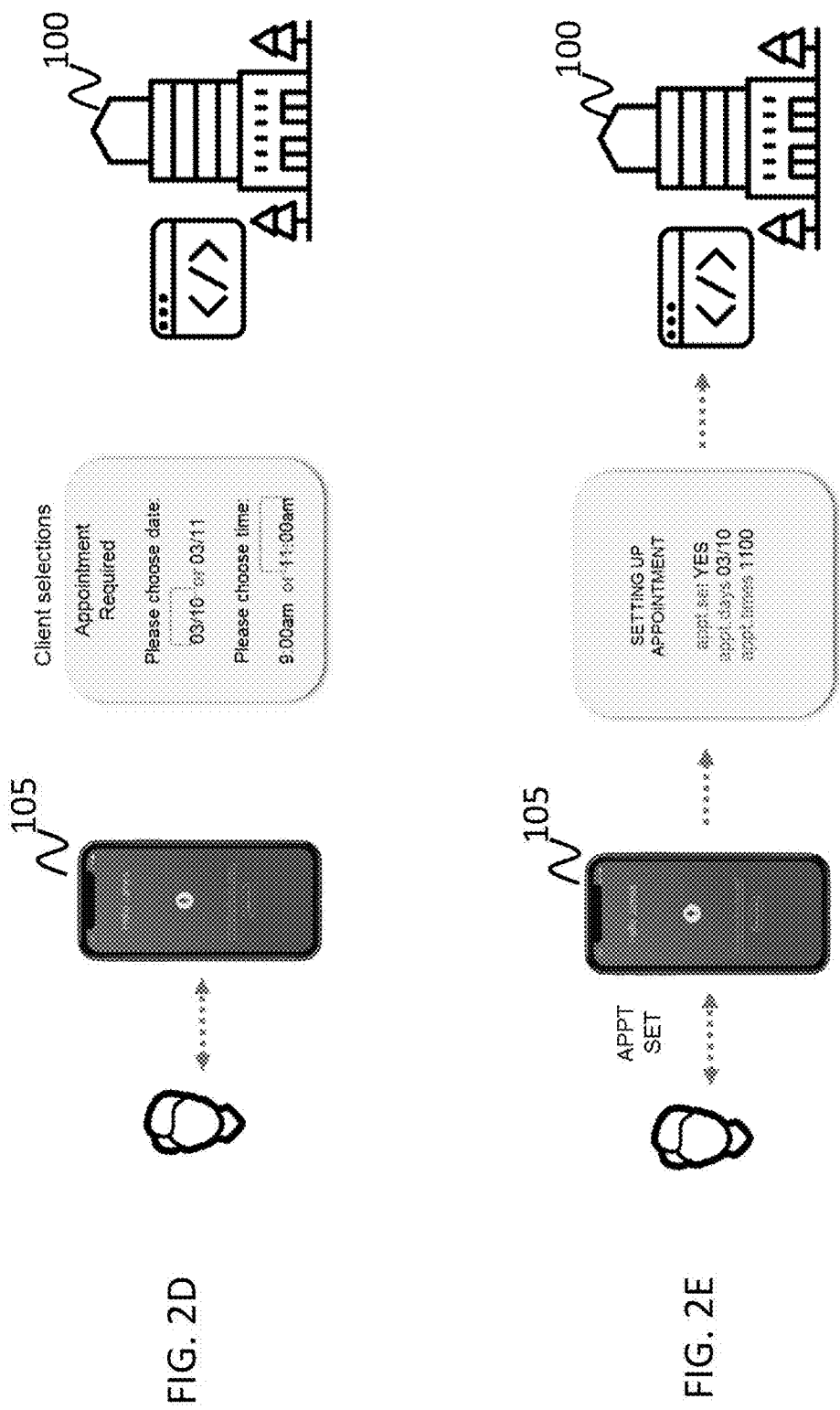

FIG. 2C is a diagram showing that the user has been prompted 240 to choose between two dates ("03/10 or 03/11") and to choose between two times on those dates ("9:00 am or 11:00 am"). In some embodiments, these options are displayed in the user interface of the personal bot as executed by the end user device 105. In FIG. 2D, the user selects 242 one of the dates and one of the times, and in FIG. 2E, the user's selections 250 are transmitted to the enterprise 215 through the API 220 in order to accept the appointment. The user interface running on the end user device 105 may also display a confirmation 255 that the appointment has been booked.

Accordingly, aspects of embodiments allow customers to make requests or obtain services from an enterprise with low personal involvement. For example, the user's authentication information sent in the original request 210 may be automatically loaded from a customer profile (e.g., stored on the end user device 105) and transmitted to the enterprise without the need for the customer to enter the information for this particular transaction. The user did not need to navigate a menu system (either in an interactive voice response or on a website) in order to obtain service. The only prompt that was presented to the user was to schedule a time for the appointment. Therefore, embodiments provide a technical improvement to the field of interactions between customers and enterprises, by reducing the need for customers to learn and to navigate enterprise-specific user interfaces in order to obtain services from the enterprise.

Personal Bots for Interactions with Enterprises

Figure 3:
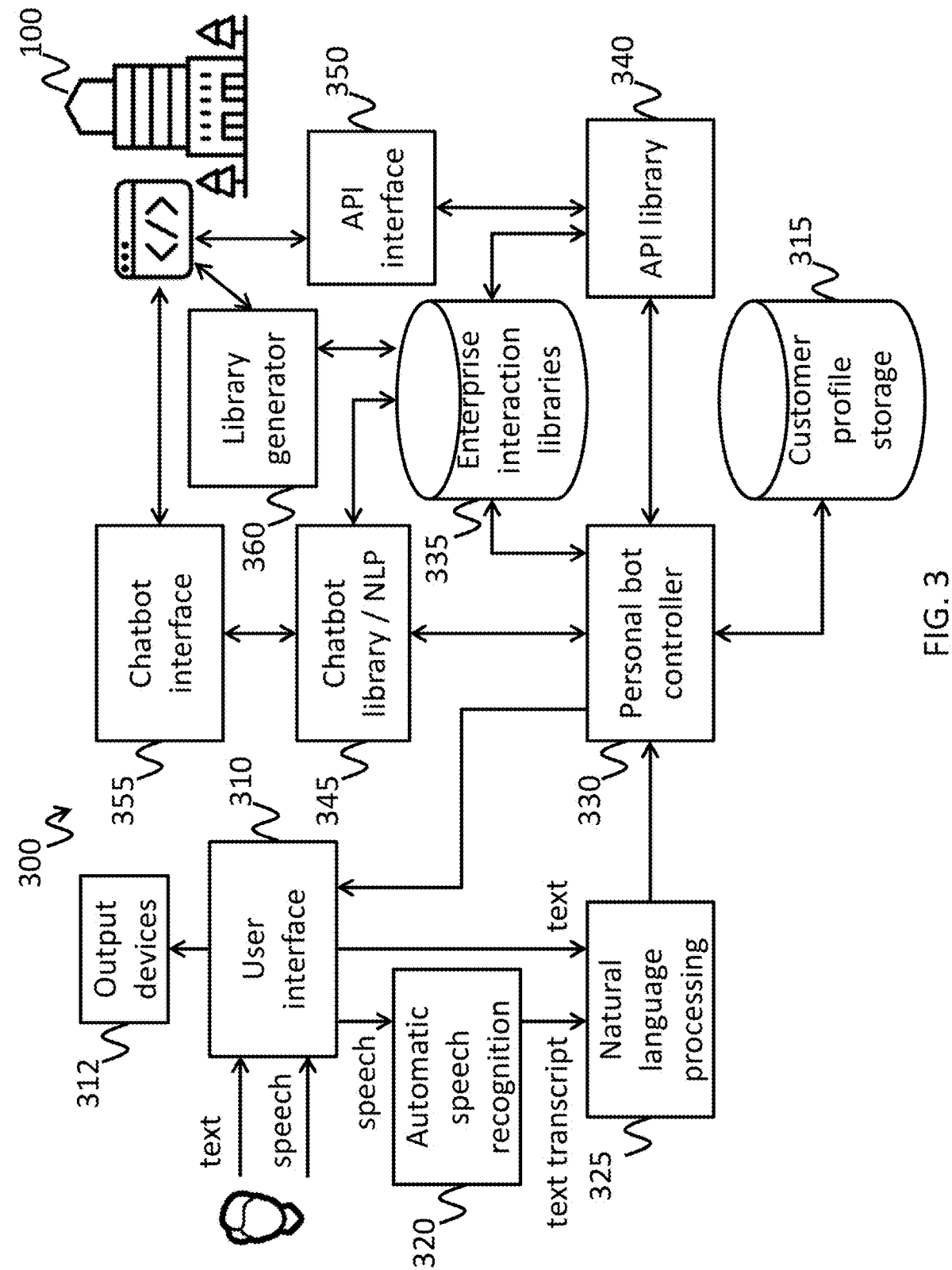
FIG. 3 is a block diagram of a personal bot system, according to one embodiment, for automating interactions with enterprises.

FIG. 3 is a block diagram of a personal bot system, according to one embodiment, for automating interactions with enterprises. As discussed above, in various embodiments, various aspects of the personal bot system 300 may be physically located in, and performed by, an end user device, such as one of the end user devices 105, while other aspects of the client-side system may be physically located in, and performed by, a cloud computing service 180 (e.g., a computer connected to the internet).

Considerations relating to the distribution of components between an end user device 105 and a cloud computing system include the computational power of the end user device 105 (e.g., less powerful end user devices may lack the processing power to perform computations related to the automation of interactions locally, therefore more of the work may be done by the cloud computing system) and energy usage (e.g., computations performed locally may consume a significant amount of energy, which would discourage processing by a battery power device such as a smartphone and encourage more work to be done by the cloud computing system). Other considerations include privacy concerns with respect to personal data (e.g., users may prefer that sensitive personal data be stored only on their end user devices 105 rather than in a cloud computing service, or the storage of personal data in cloud services may be subject to laws such as the General Data Protection Regulation (GDPR), thereby encouraging storage on end user devices 105) and delays caused by the transmission of data (e.g., local processing on the end user devices 105 may be preferred over transmitting and receiving large amounts of data to and from the cloud computing service due to latency, data allocation usage, and power usage for communications).

Figure 4A:
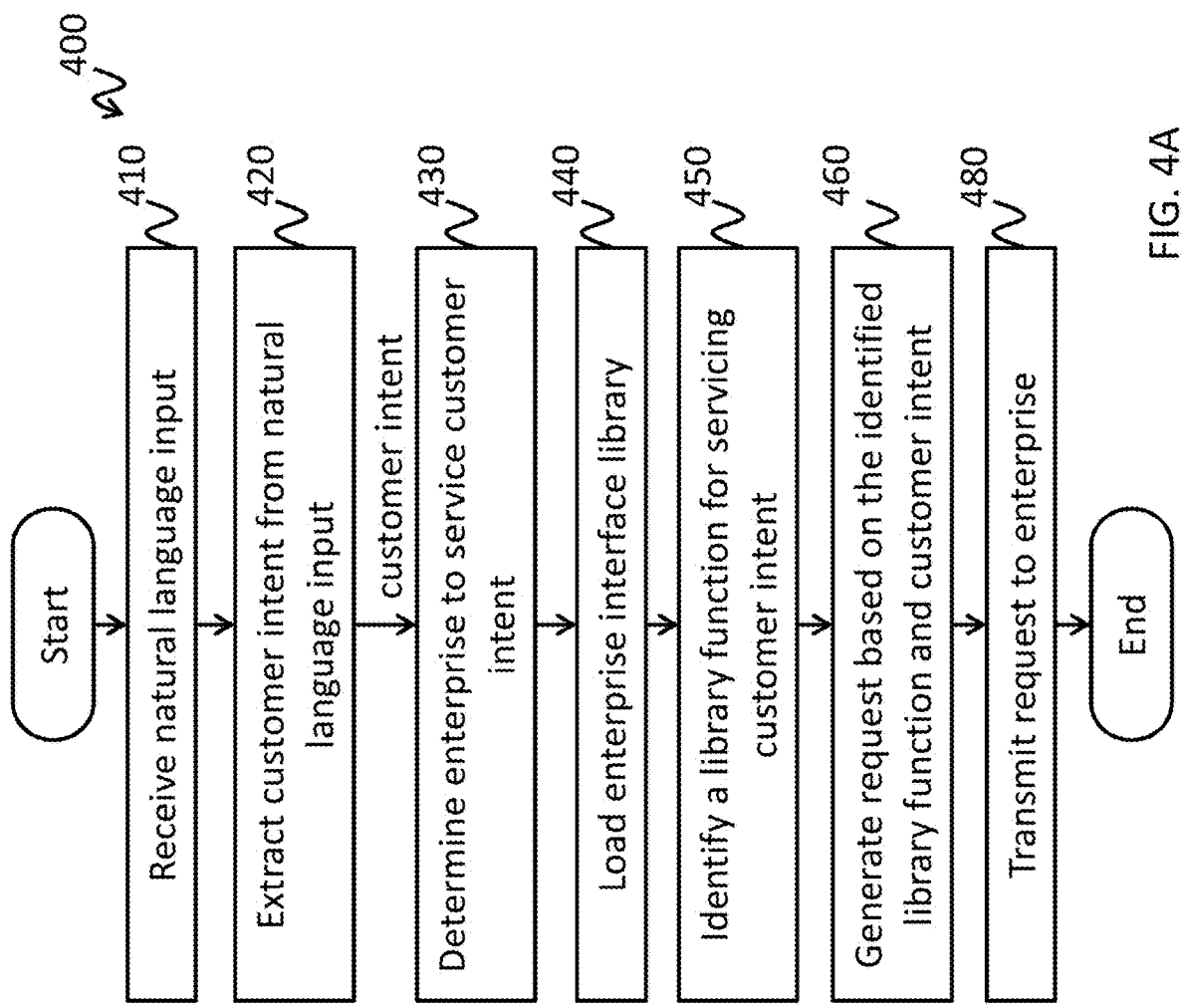
FIG. 4A is a flowchart depicting a method, according to one embodiment, for generating a request from a natural language user input.

FIG. 4A is a flowchart depicting a method 400, according to one embodiment, for generating a request from a natural language user input.

As shown in FIG. 3, the personal bot system 300 includes a user interface 310 executed on the end user device (e.g., end user device 105) for receiving user input (or "customer input") and for providing feedback to the user (or "customer"). As noted above, an end user device 105 may have a microphone or physical user input device for receiving a natural language input from a customer (e.g., speech received through a microphone or text entered through a hardware keyboard or software keyboard on a touch screen). The user interface 310 may also be connected output hardware devices 312 such as display devices, speakers, headsets, etc.

The personal bot system 300 includes a customer profile storage module 315, which stores customer profile data. The customer profile data may include information previously provided by the user, such as the user's personal information (e.g., name, address, phone number, etc.), payment information (e.g., credit card or debit card numbers, bank account information, etc.), identifies of the customer's service providers (e.g., internet service provider, financial institutions, etc.), and authentication information (e.g., usernames, passwords, authentication tokens, etc.). Examples of systems and methods for storing customer profile information can be found, for example, in U.S. Provisional Patent Application No. 62/686,077 "SYSTEM AND METHOD FOR CUSTOMER EXPERIENCE AUTOMATION," filed in the United States Patent and Trademark Office on Jun. 17, 2018 and U.S. patent application Ser. No. 16/151,362, the entire disclosures of which are incorporated by reference herein.

In operation 410, the personal bot system 300 receives the natural language input from the user, and extracts a customer intent from the natural language input in operation 420. In more detail, when the natural language user input 410 is speech, an automatic speech recognition (ASR) engine 320 (e.g., a large vocabulary continuous speech recognition (LVCSR) engine) may be used to generate a text transcript of the customer speech. The customer intent is then extracted from the text transcript of the speech or the directly input natural language text.

According to one embodiment, a natural language processing engine 325 of the personal bot system 300 determines customer intent using an intent classifier. One example of an intent classifier uses a long short-term memory network (see, e.g., Meng, Lian, and Minlie Huang. "Dialogue Intent Classification with Long Short-Term Memory Networks." *National CCF Conference on Natural Language Processing and Chinese Computing*. Springer, Cham, 2017.). Other examples include multinomial naïve Bayes (see, e.g., Christopher D. Manning, Prabhakar Raghavan and Hinrich Schütze, *Introduction to Information Retrieval*, Cambridge University Press. 2008, 253-87.), neural networks, or other classifiers. As another example, intent classification may be performed by removing stop words (e.g., words having low information content, such as "the," "is," and "at") from the natural language request and detecting salient words (e.g., words having a high term frequency-inverse document frequency or TF-IDF, based on a collection of training phrases previously supplied to the natural language processing engine 325). In the above example shown in FIG. 2A, regarding the customer may provide a natural language input such as "my laptop can't connect to the internet," and the natural language processing engine 325 may extract a customer intent as a phrase such as "internet connection service."

In operation 430, a personal bot controller 330 of the personal bot system 300 identifies an enterprise capable of servicing the customer intent. The personal bot controller 330 or personal bot controller circuit may be implemented using one or more computing circuits distributed between a local device (e.g., an end user device 105) and a remote device (e.g., a cloud computing service 180), where examples of computing circuits include: a processor coupled to memory storing instructions that configure the personal bot controller circuit to operate in accordance with embodiments; a field programmable gate array (FPGA) configured to operate in accordance with embodiments; or an application specific integrated circuit configured to operate in accordance with embodiments. In some embodiments, the personal bot controller 330 loads customer profile data from the customer profile storage module 315 (e.g., a database stored in the end user device 105 or stored in a cloud computing service 180) to identify potential enterprises associated with the customer intent. For example, the customer profile data may identify a particular company as the customer's internet service provider. Accordingly, the personal bot controller 330 identifies the relevant enterprise (the customer's internet service provider) based on the content of the customer intent (internet connection service).

In some circumstances, there may be multiple potential enterprises that could satisfy the customer intent. For example, if the customer intent were to "order a medium sized mushroom pizza," and the customer profile identified multiple nearby pizza delivery companies, the personal bot 300 may identify a particular one of the identified potential enterprises. For example, a customer profile may include customer preferences that include a ranking (or rank ordered list) of service providers. As another example, the personal bot 300 may prompt the customer for an explicit selection among the service providers. In some circumstances, the natural language input from the customer may identify a service provider (e.g., "order a medium sized mushroom pizza from Pinocchio's Pizza").

After determining an enterprise to contact, in operation 440 the personal bot system 300 loads an enterprise interface library (from an enterprise interaction library storage 335) for interacting with the identified enterprise. In some embodiments, the enterprise interface library is an enterprise API library 340 configured to interact with a public application programming interface (API) published by the enterprise. In some embodiments, the enterprise interface library is an enterprise chatbot library 345 configured to interact with a chatbot operated by the enterprise.

In some circumstances, no existing library is available, and an enterprise library for the enterprise is automatically generated to handle the customer request, as described in more detail below. In some circumstances, the loaded library may be found to be obsolete (e.g., dependent on APIs that have been discontinued by the enterprise, or assuming particular chatbot responses that are no longer valid). Under such circumstances, in some embodiments, the library for the enterprise is automatically updated to conform to the current state of the enterprise's interfaces, as described in more detail below.

In some embodiments, the library for a particular enterprises includes one or more functions or endpoints corresponding to different functions that can be performed at the enterprise using the library. For example, a library for interacting with a cable company may include functions for: requesting technical support; changing service levels; requesting a current invoice; paying a bill; canceling service; etc. As another example, a library for interacting with a bank may include: requests for money transfers; bill payment; credit card payment; inquiries on current balances; loan applications; etc. As still another example, a library for interacting with an airline may include: purchasing airline tickets; requesting upgrades; checking on the status of flights; etc. Libraries may also include functions for authenticating a customer with an enterprise and for setting up new user accounts with those enterprises.

Each function in an enterprise interface library is associated a description of the function or purpose of the function. In some embodiments, the description includes one or more keywords and/or natural language descriptions of the functions. In operation 450 the personal bot 300 identifies one or more library functions for servicing the customer request. In some embodiments, the one or more library functions are identified by searching the descriptions of the functions for terms that match the customer intent extracted from the natural language input. In many instances, the particular words used by the customer may not be identical to the words that appear in the description. For example, "flight" and "plane ticket" have very similar meanings, but do not have the same words. Accordingly, in some embodiments, the mapping of the customer intent to the function description is done via bi-directional intent classification. First the customer description of his or her issue is mapped into a category or a topic (for instance "Airline seat change" or "flight Date change") The descriptions of the functions are also mapped using intent classification into the same set of categories (e.g., previously mapped or tagged with the categories during generation of the library or dynamically mapped during runtime). As such, the personal bot controller 330 activates or identifies the function that is mapped to the same category as the customer intent.

After identifying an appropriate function from the library, the personal bot system 300 generates a request from the function in operation 460. Each function in an enterprise interface library may also be associated with one or more input parameters or arguments that are provided to the enterprise to perform the action. For example, the parameters or arguments of a function to purchase a plane ticket may include: "origin," "destination," "departure date," "return date," and "booking class." Each of these parameters or arguments is also associated with a description including one or more keywords, including the name of the argument. In some circumstances, the parameters or arguments for a function may also include authentication parameters, such as a username and password combination or an authentication token (e.g., an OAuth token).

Figure 4B:
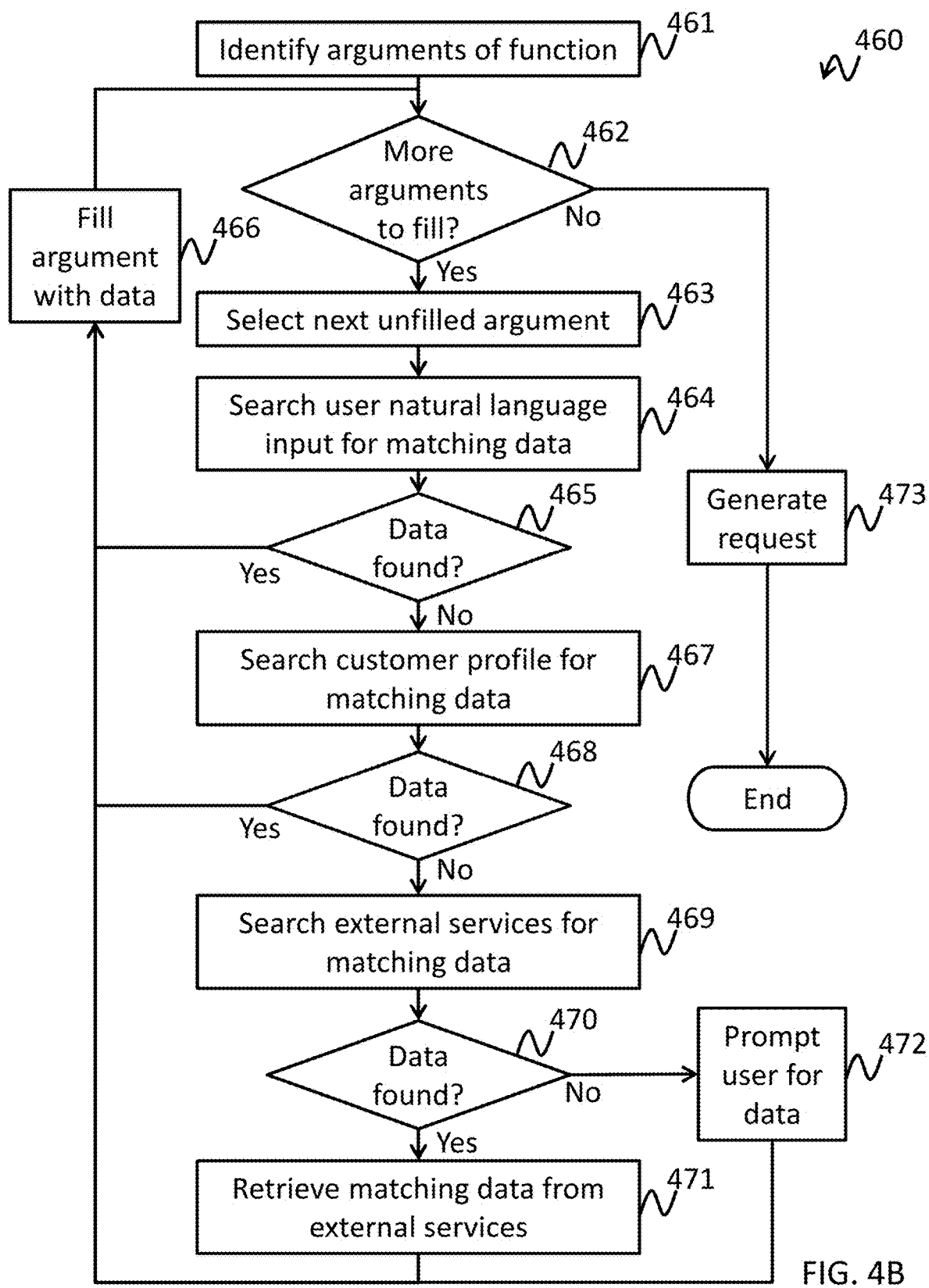
FIG. 4B is a flowchart of a method, according to one embodiment, for filling in the arguments of a function that was identified for satisfying the customer intent.

FIG. 4B is a flowchart of a method, according to one embodiment, for filling in the arguments of a function that was identified for satisfying the customer intent. In various embodiments, the personal bot 300 searches various information sources to obtain the information for filling the parameters or arguments of a function. In operation 461, the personal bot controller 330 identifies the (zero or more) arguments of the function. In operation 462 the personal bot controller 330 determines if there are more arguments to be filled in. If so, then the personal bot controller 330 selects the next unfilled argument in operation 463, and searches the natural language input (as analyzed by the natural language processing engine 325) for data that is semantically tagged with a tag that matches the description of the argument. In some embodiments, named-entity extraction (NER) techniques are used to identify, tag, and extract potions of data such as natural language text (e.g., the natural language input phrase and customer profiles) for insertion as values of the arguments to the function. (See, e.g., Nadeau, David, and Satoshi Sekine. "A survey of named entity recognition and classification." *Lingvisticae Investigationes* 30.1 (2007): 3-26.)

Continuing the above example, if a customer spoke the phrase "book a flight on Southwest from LAX to SFO on May 19, returning on May 24," the natural language processing engine 325 of the personal bot system 300 automatically identifies and labels the various portions of the natural language input phrase based on the extracted customer intent. For example, given that the identified customer intent is "book a flight," the phrase "from LAX" would be semantically tagged by the natural language processing engine 325 with an "origin" tag (e.g., because it includes a place, "LAX" and is associated with the preposition "from") and the phrase "to SFO" would be semantically tagged with a "destination" tag (because it identifies a place, "SFO," and is associated with the preposition "to").

In operation 465, the personal bot controller 330 determines if data matching the selected unfilled argument was found. If matching data is found, then the personal bot controller 330 fills the argument with the matching data in operation 466 and returns to operation 462 to determine if there are more arguments to fill.

If matching data is not found, then the personal bot controller 330 searches the customer profile in the customer profile storage 320 for more information. In particular, the fields of data in the customer profile are also associated with tags or labels identifying the semantic meaning of the data stored therein. Accordingly, missing fields such as the customer's booking class preference, may be searched for within the customer profile. For example, if the customer specified in the customer profile a preference for seats with extra legroom, such as "economy plus" or "premium economy" seats, the personal bot 300 may use this explicit information to select a particular booking class. As another example, the customer's frequent flier account number may be stored in the customer profile and automatically retrieved and provided as part of the request.

Another example of data stored in the customer profile may include authentication information such as usernames, passwords, and authentication tokens. Various requests to enterprises may require users to be authenticated prior to exchanging information. Some enterprises may require a username and password to be supplied with API calls or that a user be logged in before interacting with a chatbot. Some enterprises may require an authentication token, such as an OAuth token, to be included in API calls. In some embodiments, an enterprise interface library includes an authentication function configured to obtain an authentication token (e.g., an OAuth token) for interacting with an enterprise. Obtaining the token may involve entering a stored username and password or prompting the customer for entry of this information. The obtained token can then be stored as part of the customer profile for use in later requests to the enterprise.

In operation 468, the personal bot controller 330 determines if data matching the selected unfilled argument was found. If matching data is found, then the personal bot controller 330 fills the argument with the matching data in operation 466 and returns to operation 462 to determine if there are more arguments to fill.

If matching data was not found in the customer profile data, then, in some embodiments, in operation 469, the personal bot controller 330 searches external services for matching data. If such matching data is found, then the data is retrieved from the external service in operation 471 and used to fill the argument field of the request. For example, a function for booking a rental car with a rental car company may request that the user provide flight information. Under these circumstances, if the flight information is not stored in the customer profile, the personal bot controller 330 accesses the airline companies to request information about the status of the customer's current reservations, and retrieves the flight arrival information from a reservation matching the date of the rental car request. The retrieved flight arrival information is then added to request assembled for the rental car company, without intervention from the customer.

If data is not found in any of the data sources available to the personal bot controller 330, then, in some embodiments, in operation 472, the personal bot controller 330 prompts the user for the missing data. In some embodiments, the prompt is displayed or played through audio (e.g., text to speech) using the user interface 310 of the personal bot system 300. A customer can then respond to the request for information by speaking a response or entering a response using the user input devices of the end user device.

Embodiments are not limited to the flowchart shown in FIG. 4B. For example, in some embodiments, the prompting of the user is performed after failing to find the data in the customer profile, without searching external services for the data. In some embodiments, the prompting of the user is performed after failing to find the matching data in the natural language user input, without searching the customer profile for matching data.

In addition, some aspects of embodiments relate to using different functions of the library to fill the arguments of the identified library function for servicing the customer intent. For example, when the customer intent is to book a flight as described above, the function for booking the flight may have, as arguments, a date and a particular flight number. If the natural language input from the customer merely specifies date, time, and origin and destination airports, then there might not be sufficient information in the natural language input or in the customer profile to fill all of the arguments. However, the enterprise library for the airline may provide another function that searches for flights that match particular conditions (e.g., origin and destination airports and dates) and that returns a list of flight numbers with their associated departure and arrival times. Accordingly, some aspects of embodiments relate to generating a dependency graph between functions by identifying return values of functions that contain data that can be supplied as inputs to other functions. In this particular example, the flight booking function depends on data from the flight search function. Accordingly, in some embodiments, to service the customer intent, the personal bot processor 330 determines whether the identified library function includes one or more dependencies on other functions and resolves the dependencies (and any dependencies of those functions) to fill the arguments of the identified function. The previous example of executing a library function to obtain an authentication token, if one is not already stored in the customer profile, is one case of a dependency on another function.

Once all of the arguments have been filled in with information, the personal bot controller 330 generates the request in operation 473 by supplying the retrieved arguments to the function. For example, in the case of a request sent using an enterprise API, the generation of the request may include formatting the data as defined by the API, and as controlled by the enterprise API library 340. More specifically, this may include generating a JSON or XML payload with the retrieved data inserted into various fields of the payload. In the case of a chatbot interface, in some embodiments, text representations of the parameters are combined (e.g., concatenated with separators such as spaces) to generate a text string. In some embodiments, this may include generating a text string by inserting the information in a template approximating human text (e.g., "I would like to book a flight from <origin> to <destination> on <departure date>, returning on <return date>, flying <fore class>, my frequent flier number is <account number>"), as controlled by the enterprise chatbot library 345.

In operation 480, the personal bot system 300 transmits the generated request to the enterprise. For example, when using a REST API the personal bot system 300 may use the API interface 350 to make an HTTP POST with the generated payload, or when using an enterprise chatbot, the personal bot system 300 may use the chatbot interface 355 to access the chatbot and inserting the generated text into the chat field. In some circumstances, the enterprise may provide a particular protocol for interacting with a chatbot, such as social media networks (such as Facebook® Messenger, Twitter®, and Slack®), Internet Relay Chat, and web based chatbots (e.g., using web browser automation software such as Selenium).

Figure 5:
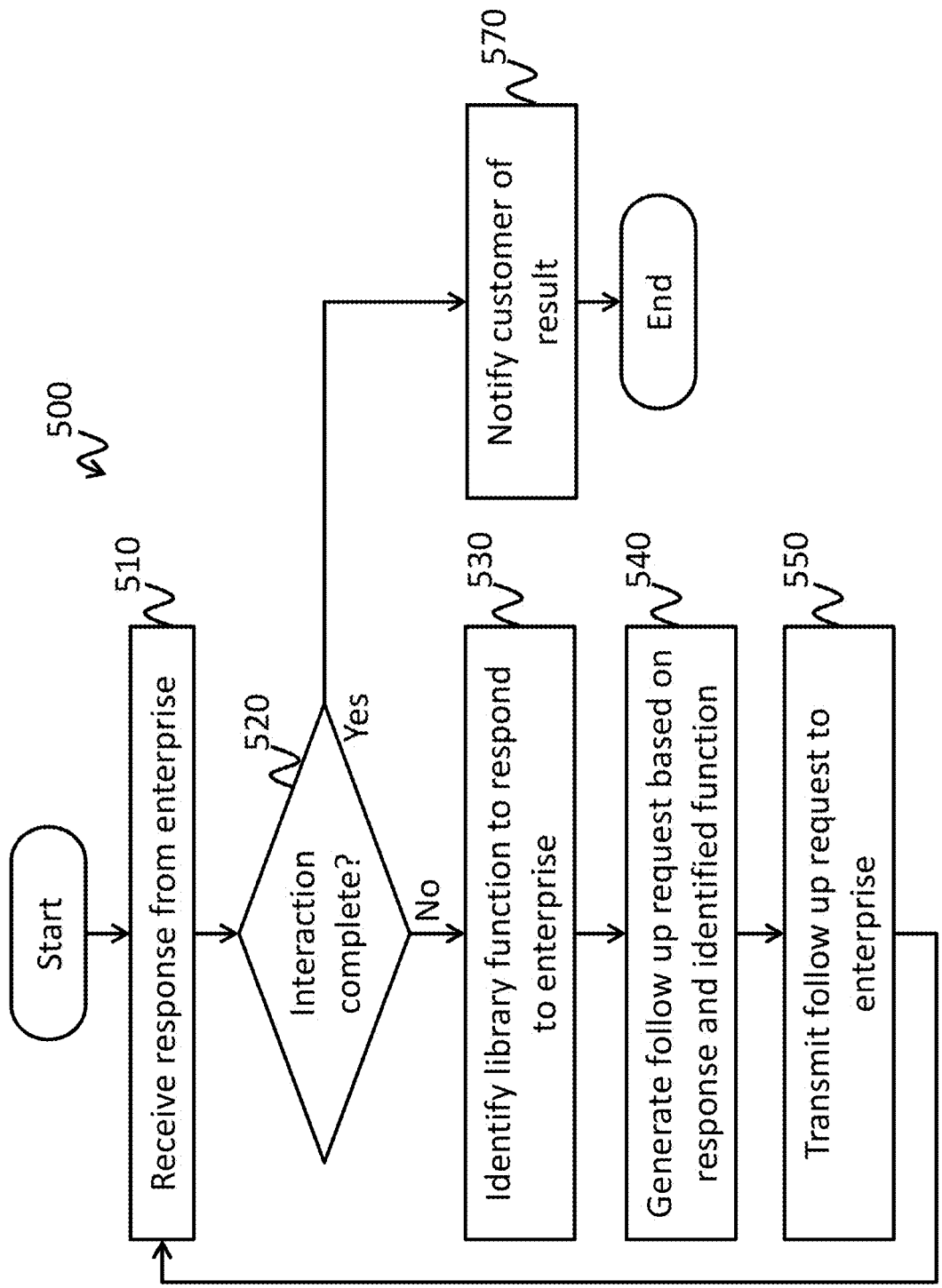
FIG. 5 is a flowchart illustrating the operations of a personal bot system, according to one embodiment, during an interaction with an enterprise.

FIG. 5 is a flowchart illustrating the operations of a personal bot system, according to one embodiment, during an interaction with an enterprise. In some circumstances, an enterprise will respond to the initial request from the personal bot system 300 with an answer or resolution to the customer intent. For example, when requesting information about the status of current flight reservations, the enterprise may respond directly with a list of all flights booked by the customer and associated details. However, in some circumstances, the enterprise may request additional information based on the information in the initial request.

Continuing the above example, when booking a flight, the airline may respond with a list of flights available from LAX to SFO on May 19 and a list of flights available from SFO to LAX on May 24, along with flight information such as departure times, arrival times, and prices. The personal bot system 300 would then respond to this request for more information with the selection of a particular pair of flights. Similarly, after selecting flights, the enterprise may request the choice from among a list of available seats.

In more detail, in operation 510, the personal bot system 300 receives a response from the enterprise, such as through the API interface 350 or the chatbot interface 355. The received response is parsed by the API library 340 or the chatbot library (and natural language processing engine 325) 345 to generate a result in a common format to be processed by the personal bot controller 330. In operation 520, the personal bot controller 330 determines whether the interaction is complete. In some embodiments, the interaction is determined to be complete when a termination condition has been met, where termination conditions include: satisfaction of the customer intent (e.g., confirmation that the plane ticket has been purchased, confirmation that a technician service call has been scheduled, etc.); a failure condition (e.g., no available flights, no available service times, etc.); or a technical failure condition (e.g., enterprise API or chatbot offline, no internet connection, etc.). In some embodiments, in interactions with an enterprise chatbot, the termination condition is determined by using a natural language processing engine to determine whether the semantic content of the response from the chatbot indicates that the interaction is complete (e.g., detecting termination phrases such as "Thank you for your business. Please close the chat window." or "Is there anything else I can help you with today?").

If the interaction is not complete, then, in operation 530, the personal bot controller 330 identifies a library function to use for responding to the enterprise. In some embodiments, the library includes only a single function for sending text to the enterprise chatbot, as opposed to separate functions for different types of operations. In some embodiments, the personal bot controller 330 identifies one or more fields of requested information appearing in the response from the enterprise and identifies a library function that includes those fields in its arguments. In some embodiments, the personal bot controller 330 further identifies information requested by the enterprise from the enterprise response.

In operation 540, the personal bot controller 330 generates a request (a "follow-up request") in a manner similar to that described above with respect to FIG. 4B. For example, in some embodiments, the personal bot controller 330 searches the natural language input, the customer profile, the response from the enterprise, external services, and/or prompt the customer, in a manner similar to that described with respect to operation 460, to obtain information to generate a request to supply the information requested by the enterprise. The response from the enterprise may include information to be included as an argument in a follow-up request. For example, the response may include session information such as a session identifier or session key for identifying the particular interaction between the personal bot system 300 and the enterprise, and the API may require that each function call to the API include this session information.

As noted above, in some circumstances, the response from the enterprise will include one or more options that the customer can select from. In the specific example given above, the response included a list of flights matching the criteria specified by the customer. As other examples, the options presented in the response may relate, for example, dates and times for appointments for the services requested by the customer, service level options (e.g., standard, plus and premium level services), and the like. In some embodiments, the list of options is presented to the customer using the user interface 310 (e.g., the output devices 312) so that the customer is prompted to select from those options. In some embodiments, the personal bot controller 330 uses the natural language input, the customer profile, and/or the external services to attempt to select options from the list. For example, if the natural language input from the customer specified that the customer wanted a "morning flight to SFO and the last flight back to LAX," then the personal bot controller 330 may have sufficient information to select from the presented lists of flights.

In operation 550, the personal bot controller transmits the generated "request" to the enterprise to answer the response from the enterprise, and the personal bot controller 330 returns to operation 510 to await a further response from the enterprise.

If the interaction is determined in operation 520 to be complete, the result of the interaction is presented to the customer in operation 570. In some embodiments, the user interface 310 displays an indication of the result of the interaction. In some embodiments, a notification is generated using a notification system of the end user device 105. In some embodiments, an electronic message such as an email or a text message is generated and sent to an account associated with the customer. In some embodiments, the personal bot system 300 synthesizes speech (e.g., by providing text to a text-to-speech engine) to speak information about result to the user (e.g., "Your round trip tickets between LAX to SFO have successfully been booked.").

Accordingly, some aspects of embodiments relate to automating back-and-forth interactions between an enterprise and a personal bot. In some embodiments, automatic back-and-forth interactions between a personal bot and an enterprise allows the personal bot to negotiate transactions with the enterprise on behalf of the customer with reduced or no involvement from the customer.

Generating Libraries for Interacting with Enterprise Application Programming Interfaces (APIs)

Some aspects of embodiments relate to automatically generating libraries for interacting with published enterprise application programming interfaces (APIs). The automatic generation of libraries reduces or eliminates the manual generation of a library through the reading of API documentation and manual programming of a library to provide an interface between the personal bot system 300 and the enterprise API.

Generally, when an enterprise publishes an API, documentation is provided according to known standards such as Swagger (https://swagger.io/) or OpenAPI (https://github.com/OAI/OpenAPI-Specification) in a common place such as http://companyname.com/API, or in a centralized location such Swagger Hub (https://app.swaggerhub.com/).

In some embodiments, the application programming interface (API) of an enterprise is accessible through the web servers 155 of the enterprise using a Representational State Transfer (REST) architecture where data is communicated over a hypertext transfer protocol (HTTP).

Figure 6:
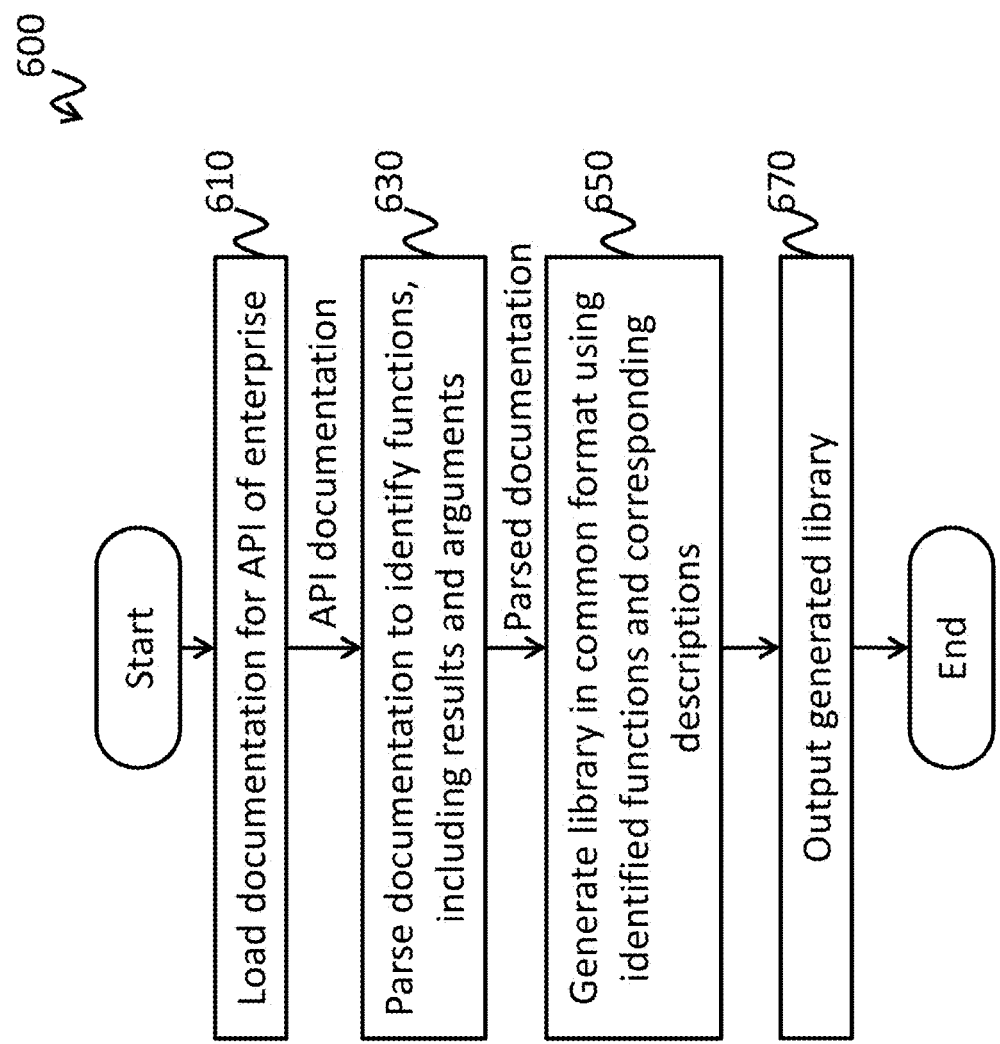
FIG. 6 is a flowchart of a method, according to one embodiment, for automatically generating a library for interacting with an application programming interface (API) of an enterprise.

FIG. 6 is a flowchart of a method 610, according to one embodiment, for automatically generating a library for interacting with an application programming interface (API) of an enterprise. In operation 610, the library generator 360 of the personal bot system 300 loads publicly available documentation on the API of the enterprise. This documentation may include, for example, documents that define the API.

In some embodiments, the library generator 360 of the personal bot system 300 either communicates with the company documentation API page directly. In some embodiments, the library generator 360 of the personal bot system 300 searches a centralized location, such as Swagger Hub, for the API documentation. In some embodiments, the library generator is executed in a cloud service. In some embodiments, the libraries generated by the library generator are shared for use by other personal bots (e.g., the enterprise interaction libraries 335 may be stored in cloud storage).

In operation 650, the library generator 360 generates a library from the parsed documentation in a common format corresponding to the personal bot system 300. The use of a common format among the various libraries generated to interact with different enterprises allows the same personal bot controller 330 to use the same processes or methods to interact with a variety of different enterprises which may have APIs that operate in different ways (e.g., different processes or flows or sets of arguments or results in the use of their APIs). In some embodiments, a code generation tool, such as Swagger Codegen (see, e.g., https://github.com/swagger-api/swagger-codegen) is used to automatically generate a library in any of a variety of programming languages. For example, if the personal bot system 300 is implemented using the Python programming language, the Swagger Codegen tool may be used to automatically generate a Python library for interacting with an enterprise.

As noted above, as part of the library generation operation, the functions within the library are tagged or associated with descriptions. In some embodiments, the library generator 360 creates these descriptions copying the "summary" or "description" fields from the documentation. Similarly, the descriptions of the arguments (or "parameters") to the functions may also be copied from the portions of the documentation that provide the "name," "summary," and/or "description" fields associated with the arguments.

The generated library may include one or more functions that are callable or executable by the personal bot controller 330 to interact with the enterprise API, where the library abstracts or hides from the personal bot controller 330 the specific details of how the API is accessed. For example, a library may merely expose the description and arguments of the function, which the personal bot controller 330 can use to identify and execute the function. As discussed above, the library then uses the argument or parameter values supplied by the personal bot controller 330 to generate an appropriate API payload (e.g., a JSON or XML payload) and submit the payload to the appropriate API endpoint (e.g., a uniform resource locator or URL) associated with the identified function call, where the API endpoints for the various functions are specified in the API documentation.

Table 1 is an example of Swagger documentation for an API function for reserving a seat on a plane flight, where the documentation is shown in the JSON format.

TABLE 1

```
{
  "swagger" : "2.0",
  "info" : {
    "description" : "The purpose of the Seat Assign feature is to reserve seats on connecting flights.",
    "version" : "1.0.0",
    "title" : "Swagger LH OpenAPI",
    "contact" : {
      "name" : "Star Alliance API team",
      "url" : "http://developer.lufthansa.com",
      "email" : "lh_mdw_central_services@dlh.de"
    }
  },
  "host" : "api-sandbox.lufthansa.com",
  "basePath" : "/api/seatassign/v1",
  "schemes" : [ "https" ],
  "produces" : [ "application/json", "application/xml" ],
  "paths" : {
    "/assignSeats" : {
      "post" : {
        "description" : "Assigns seats and returns information about reserved seats.",
        "operationId" : "assignSeats",
        "consumes" : [ "application/json", "application/xml" ],
        "produces" : [ "application/json", "application/xml" ],
        "parameters" : [ {
          "name" : "Content-Type",
          "in" : "header",
          "description" : "application/json",
          "required" : true,
          "type" : "string"
        }, {
          "name" : "transactionID",
          "in" : "header",
          "description" : "unique request ID - example 1541756066253-rrt-0beb5942ae9639554-a-de-20242-4093453-1,"
          "required" : true,
          "type" : "string"
        }, {
          "in" : "body",
          "name" : "body",
          "description" : "Input JSON",
          "required" : true,
          "schema" : {
            "$ref" : "#/definitions/seatassignrequest"
          }
        } ]
```

In operation 670, the library generator 360 outputs the generated library, such as for storage in an enterprise interaction library data store 335 and for use by the personal bot controller 330 for interacting with an enterprise through its API.

In some embodiments, the library is dynamically generated in response to the incoming natural language input from the customer. For example, instead of parsing the entire documentation to generate a library, the library generator 360 finds a specific API with a "summary" or "description" text that has the best match with the customer intent via intent classification techniques (as described above). When the right API is found, its parameters are parsed using the "name" or "description" property.

In some embodiments, if no appropriate API is found for accomplishing the customer intent, the personal bot uses an API to schedule a human interaction between the consumer and a human agent. The personal bot may also use the techniques described in U.S. patent application Ser. No. 16/151,362, as referenced above, to automate portions of the interaction with the human agent.

While some aspects of embodiments are described above in the context of Swagger and OpenAPI documentation, embodiments are not limited thereto, and can be applied to API documented using other data formats, such as Apiary® API Blueprint and RESTful API Modeling Language (RAML).

Accordingly, some aspects of embodiments relate to automatically generating software libraries for interacting with particular enterprises by parsing API documentation published by the enterprises.

Generating Libraries for Interacting with Enterprise Chatbots

Some aspects of embodiments relate to automatically generating libraries for interacting with enterprise chatbots. Generally, interactions with chatbots are less structured than interactions with formally-define application programming interfaces. However, because chatbots generally follow pre-defined rules or scripts, the behavior of the chatbots is predictable, thereby allowing standardized libraries to be automatically generated for interacting with those chatbots.

A library for a chatbot will generally include information such as particular ways for programmatically accessing the chatbot. As noted above, some enterprise chatbots are accessible through social media platforms (e.g., Facebook®, Twitter®, LinkedIn®, etc.) and therefore existing software libraries for interacting with these social media platforms can be adapted for delivering and receiving messages to the platforms. In such circumstances, a library for communicating with an enterprise chatbot may specify information such as the username of the enterprise chatbot on the particular social media platform. In other circumstances, the chatbots may be accessible through other interfaces such as Internet Relay Chat, REST APIs, or text messaging, and existing libraries for interacting with these interfaces may also be used for defining how messages are transmitted and received between the personal bot system 300 and the enterprise chatbot.

In some circumstances, the enterprise chatbot is accessible only through a web interface. Under such circumstances, web automation software such as Selenium may be used to bridge between the personal bot system 300 and the enterprise chatbot In particular, the web automation software can be used to parse the web page (chat window) to retrieve messages from the enterprise chatbot, and messages can be sent to the chatbot by using the web automation software to insert text generated by the personal bot system 300 into an input field of the chat window and to automatically click a button to submit the text. Accordingly, in some embodiments, an enterprise library for interacting with a chatbot is generated by searching a social media network for the name of the enterprise to identify a social media account associated with a chatbot of the enterprise, identifying a website corresponding to the website (e.g., by performing a search for the name of the enterprise using internet search engine), and analyzing the content of the website to identify entry points to the enterprise chatbots (e.g., parsing a web page to identify links with associated text such as "chat now" or "automated assistant"). In addition, in some aspects of embodiments the enterprise library for interacting with a chatbot also include business logic for dialogue management, scripts of chatbot behavior extracted based on observing common or shared portions of messages from the given enterprise chatbot during prior interactions, and determining templates or formats of text strings sent to the enterprise chatbot that elicit the desired responses from the enterprise chatbot.

In some circumstances, an enterprise website may require navigate an enterprise website to reach a state in which interactions with a chatbot can occur. For example, while some enterprises may allow interaction with a chatbot directly from the enterprise home page, some enterprises may require a user to be authenticated (e.g., logged in) before the user can access the chatbot. Accordingly, when authentication is required, the chatbot library may automatically authenticate the user by providing the user's username and password to the website in order to gain access to the enterprise chatbot. In addition, the enterprise may offer different chatbots serving different roles such as sales, technical support, and customer service. In such circumstances, the enterprise library for interacting with a chatbot also stores information about accessing the various chatbots of the enterprise (e.g., different usernames in the case of a messaging service or social media platform or different URLs in the case of web based chat) and selecting an appropriate chatbot for the automated interaction based on the customer intent (e.g., when the customer intent is determined to be related to technical support, then the personal bot controller 330 uses the enterprise library to access the technical support chatbot of the enterprise).

In some embodiments, the chatbot library may have relatively few functions, such as "authenticate" and "send message." In particular, in some embodiments, the natural language input and/or the extracted user intent may be transmitted directly to the enterprise chatbot. The enterprise chatbot may then respond based on its parsing and analysis of the customer request. As discussed above, the response from the enterprise may indicate that the request has been completed, or may indicate that more information is required (see operation 520 of FIG. 5).

In embodiments using chatbot libraries, determining whether an interaction is complete includes analyzing the response from the enterprise chatbot to determine whether the response includes a question for or other request for specific information (other than concluding questions such as "Is there anything else I can help you with today?"). In some embodiments, intent classification is used to make this determination. If the request does include a question or other request for information, then the chatbot library identifies one or more keywords (e.g., salient words) from the parsed response to determine the type of information being requested. In some embodiments, named-entity recognition is used to analyze the response to determine the subject or type or class (e.g., keywords) of the requested information. In a manner similar to that described above, the identified keywords or classes are used to search (e.g., semantically) various data sources (e.g., the natural language input, the customer profile, and the like) for data to answer the question from the enterprise and to automatically submit that identified data back to the enterprise chatbot.

In some aspects of embodiments, the chatbot library is configured to detect and learn good paths through the script used by the enterprise chatbot. For example, upon detecting an error condition such as the enterprise chatbot's failing to understand the phrasing of a request made by the personal bot system 300, the chatbot library may use the chatbot natural language processing engine to experiment with different variants of the phrases to explore phrasings that are understood by the enterprise chatbot. For example, the natural language processing engine may substitute words in the request with other words having similar semantic meaning, or may change the order of phrases within the generated request. After detecting that a variant of the phrase has been understood, the variant is saved as part of the "good path," such that later attempts to express the same customer intent can use the variant of the phrase that previously worked. In a similar way, successful interactions or successful ways of phrasing requests can be learned and stored as part of the "good path" for interacting with this particular enterprise chatbot.

Updating of Libraries Due to Changes in Enterprise API or Enterprise Chatbot

Some aspects of embodiments relate to automatically updating the API libraries when changes are made to the APIs. For example, as an API changes, the documentation may be updated to show that some API calls or functions or methods of use have been deprecated (e.g., obsolete and planned to be removed in a future version of the API). As another example, obsolete API function calls may also cause responses from the server that include errors or warnings that the particular function being used is obsolete. Accordingly, some embodiments relate to the automatic reloading and reparsing of the API documentation to update the enterprise API library to comply with the current API documentation.

Similarly, some aspects of embodiments relate to automatically updating the chatbot libraries when changes are made to the chatbots. For example, phrases that were previously part of the "good path" may no longer be accepted by the chatbot, due to changes in the enterprise chatbot script. Accordingly, some aspects of embodiments relate to detecting these changes in the chatbot script and updating the chatbot library after experimenting with, and finding, a phrasing of the information that elicits a useful response from the chatbot.

Computing Systems

Each of the various servers in the contact center, portions of the personal bot system 300 operating on a cloud based server, and portions of the personal bot system 300 operating on an end user device 105 may be a process or thread, running on one or more processors, in one or more computing devices 700 (e.g., FIG. 7A, FIG. 7B), executing computer program instructions and interacting with other system components for performing the various functionalities described herein. For the sake of convenience, when describing portions of the system as being executed by "a processor," the term processor encompasses one or more processors in one or more separate computing devices, which may be distributed between local and remote (e.g., cloud) servers. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments. A server may be a software module, which may also simply be referred to as a module. The set of modules in the contact center may include servers and other modules.

Each of the various servers, controllers, switches, and/or gateways in the afore-described figures may be a process or thread, running on one or more processors, in one or more computing devices 700 (e.g., FIG. 7A, FIG. 7B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments. A server may be a software module, which may also simply be referred to as a module. The set of modules in the contact center may include servers, and other modules.

Figure 7A:
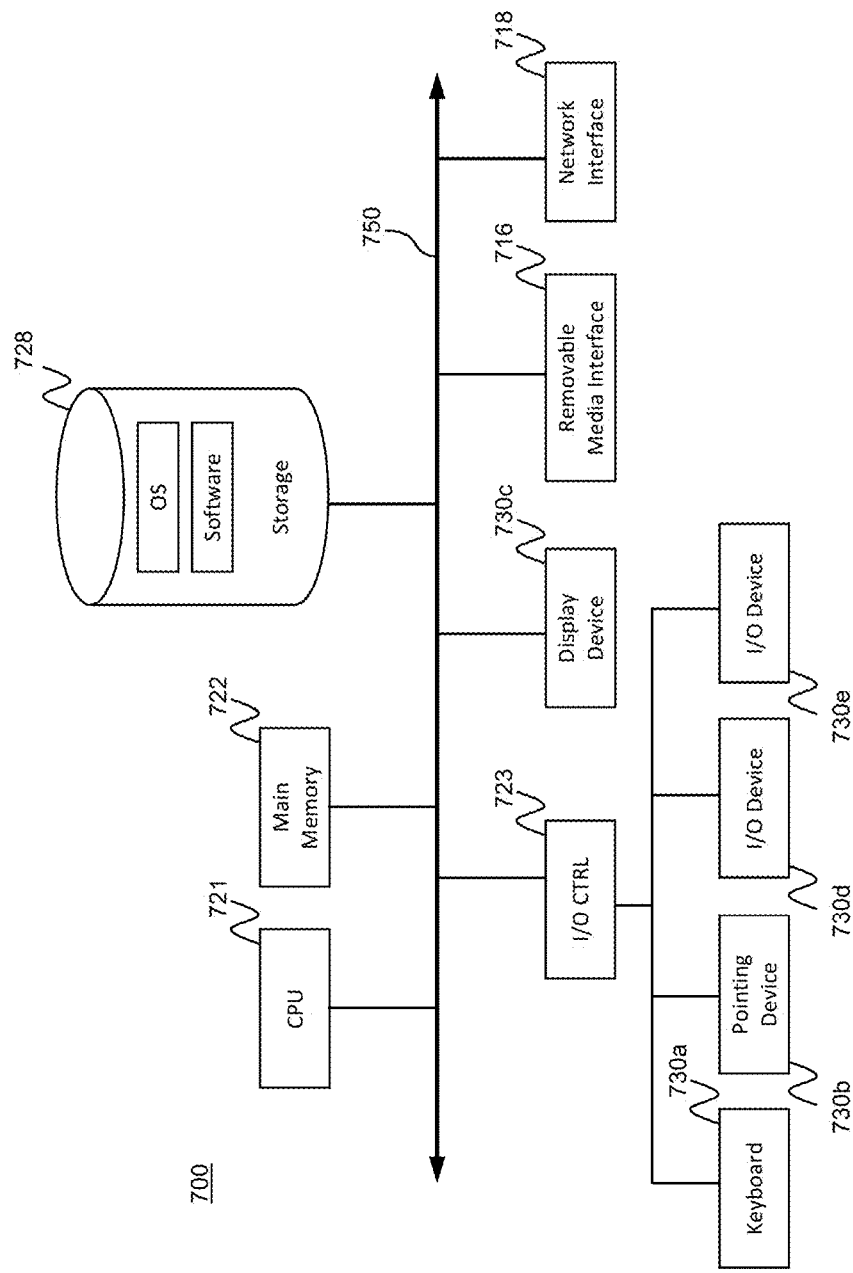
FIG. 7A is an embodiment of a block diagram of a computing device.
Figure 7B:
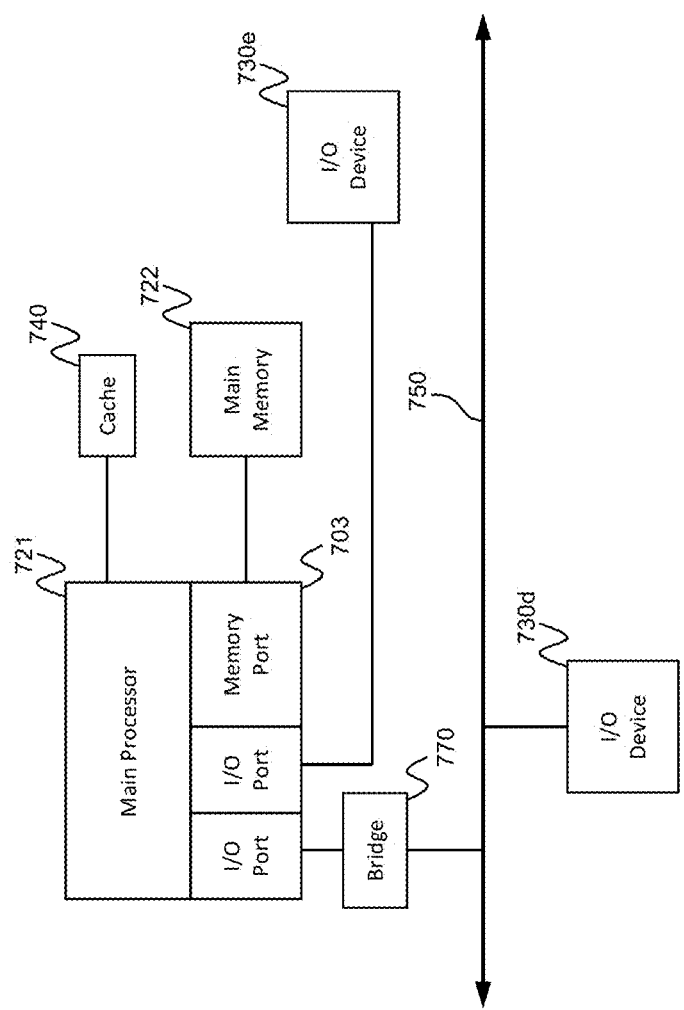
FIG. 7B is an embodiment of a block diagram of a computing device.

FIG. 7A and FIG. 7B depict block diagrams of a computing device 700 as may be employed in exemplary embodiments. Each computing device 700 includes a central processing unit 705 and a main memory unit 710. As shown in FIG. 7A, the computing device 700 may also include a storage device 715, a removable media interface 720, a network interface 725, an input/output (I/O) controller 730, one or more display devices 735c, a keyboard 735a and a pointing device 735b, such as a mouse. The storage device 715 may include, without limitation, storage for an operating system and software. As shown in FIG. 7B, each computing device 700 may also include additional optional elements, such as a memory port 706, a bridge 745, one or more additional input/output devices 735d, 735e and a cache memory 750 in communication with the central processing unit 705. The input/output devices 735a, 735b, 735d, and 735e may collectively be referred to herein using reference numeral 735.

The central processing unit 705 is any logic circuitry that responds to and processes instructions fetched from the main memory unit 710. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 710 may be one or more memory chips capable of storing data and allowing any storage location to be directly accessed by the central processing unit 705. As shown in FIG. 7A, the central processing unit 705 communicates with the main memory 710 via a system bus 740. As shown in FIG. 7B, the central processing unit 705 may also communicate directly with the main memory 710 via a memory port 706.

FIG. 7B depicts an embodiment in which the central processing unit 705 communicates directly with cache memory 750 via a secondary bus, sometimes referred to as a backside bus. In other embodiments, the central processing unit 705 communicates with the cache memory 750 using the system bus 740. The cache memory 750 typically has a faster response time than main memory 710. As shown in FIG. 7A, the central processing unit 705 communicates with various I/O devices 735 via the local system bus 740. Various buses may be used as the local system bus 740, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 735c, the central processing unit 705 may communicate with the display device 735c through an Advanced Graphics Port (AGP). FIG. 7B depicts an embodiment of a computer 700 in which the central processing unit 705 communicates directly with I/O device 735e. FIG. 7B also depicts an embodiment in which local busses and direct communication are mixed: the central processing unit 705 communicates with I/O device 735d using a local system bus 740 while communicating with I/O device 735e directly.

A wide variety of I/O devices 735 may be present in the computing device 700. Input devices include one or more keyboards 735a, mice, trackpads, trackballs, microphones, and drawing tablets. Output devices include video display devices 735c, speakers, and printers. An I/O controller 730, as shown in FIG. 7A, may control the I/O devices. The I/O controller may control one or more I/O devices such as a keyboard 735a and a pointing device 735b, e.g., a mouse or optical pen.

Referring again to FIG. 7A, the computing device 700 may support one or more removable media interfaces 720, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 735 may be a bridge between the system bus 740 and a removable media interface 720.

The removable media interface 720 may for example be used for installing software and programs. The computing device 700 may further include a storage device 715, such as one or more hard disk drives or hard disk drive arrays, for storing an operating system and other related software, and for storing application software programs. Optionally, a removable media interface 720 may also be used as the storage device. For example, the operating system and the software may be run from a bootable medium, for example, a bootable CD.

In some embodiments, the computing device 700 may include or be connected to multiple display devices 735c, which each may be of the same or different type and/or form. As such, any of the I/O devices 735 and/or the I/O controller 730 may include any type and/or form of suitable hardware, software, or combination of hardware and software to support, enable or provide for the connection to, and use of, multiple display devices 735c by the computing device 700. For example, the computing device 700 may include any type and/or form of video adapter, video card, driver, and/or library to interface, communicate, connect or otherwise use the display devices 735c. In one embodiment, a video adapter may include multiple connectors to interface to multiple display devices 735c. In other embodiments, the computing device 700 may include multiple video adapters, with each video adapter connected to one or more of the display devices 735c. In some embodiments, any portion of the operating system of the computing device 700 may be configured for using multiple display devices 735c. In other embodiments, one or more of the display devices 735c may be provided by one or more other computing devices, connected, for example, to the computing device 700 via a network. These embodiments may include any type of software designed and constructed to use the display device of another computing device as a second display device 735c for the computing device 700. One of ordinary skill in the art will recognize and appreciate the various ways and embodiments that a computing device 700 may be configured to have multiple display devices 735c.

A computing device 700 of the sort depicted in FIG. 7A and FIG. 7B may operate under the control of an operating system, which controls scheduling of tasks and access to system resources. The computing device 700 may be running any operating system, any embedded operating system, any real-time operating system, any open source operating system, any proprietary operating system, any operating systems for mobile computing devices, or any other operating system capable of running on the computing device and performing the operations described herein.

The computing device 700 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 700 may have different processors, operating systems, and input devices consistent with the device.

In other embodiments the computing device 700 is a mobile device, such as a Java-enabled cellular telephone or personal digital assistant (PDA), a smart phone, a digital audio player, or a portable media player. In some embodiments, the computing device 700 includes a combination of devices, such as a mobile phone combined with a digital audio player or portable media player.

In an embodiment, the CPU 705 may include a plurality of processors and may provide functionality for simultaneous execution of instructions or for simultaneous execution of one instruction on more than one piece of data. In an embodiment, the computing device 700 may include a parallel processor with one or more cores. In an embodiment, the computing device 700 comprises a shared memory parallel device, with multiple processors and/or multiple processor cores, accessing all available memory as a single global address space. In another embodiment, the computing device 700 is a distributed memory parallel device with multiple processors each accessing local memory only. The computing device 700 may have both some memory which is shared and some which may only be accessed by particular processors or subsets of processors. The CPU 705 may include a multicore microprocessor, which combines two or more independent processors into a single package, e.g., into a single integrated circuit (IC). For example, the computing device 700 may include at least one CPU 705 and at least one graphics processing unit.

In an embodiment, a CPU 705 provides single instruction multiple data (SIMD) functionality, e.g., execution of a single instruction simultaneously on multiple pieces of data. In another embodiment, several processors in the CPU 705 may provide functionality for execution of multiple instructions simultaneously on multiple pieces of data (MIMD). The CPU 705 may also use any combination of SIMD and MIMD cores in a single device.

A computing device 700 may be one of a plurality of machines connected by a network, or it may include a plurality of machines so connected. A network environment may include one or more local machines, client(s), client node(s), client machine(s), client computer(s), client device(s), endpoint(s), or endpoint node(s)) in communication with one or more remote machines (also generally referred to as server machine(s) or remote machine(s)) via one or more networks. In an embodiment, a local machine has the capacity to function as both a client node seeking access to resources provided by a server machine and as a server machine providing access to hosted resources for other clients. The network may be a local-area network (LAN), e.g., a private network such as a company Intranet, a metropolitan area network (MAN), or a wide area network (WAN), such as the Internet, or another public network, or a combination thereof. Connections may be established using a variety of communication protocols. In one embodiment, the computing device 700 communicates with other computing devices 700 via any type and/or form of gateway or tunneling protocol such as Secure Socket Layer (SSL) or Transport Layer Security (TLS). The network interface 725 may include a built-in network adapter, such as a network interface card, suitable for interfacing the computing device 700 to any type of network capable of communication and performing the operations described herein. An I/O device 735 may be a bridge between the system bus 740 and an external communication bus.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system for automating interactions with enterprises, the system comprising:
   a user interface configured to receive a natural language request from a customer;
   a customer profile storage module;
   a natural language processing engine executed by a processor and configured to determine a customer intent from the natural language request;
   a personal bot controller circuit configured to conduct an automated interaction by:
      determining an enterprise to service the customer intent;
      loading an enterprise library for interacting with an application programming interface (API) of the enterprise, the enterprise library comprising one or more library functions;
      identifying a library function for servicing the customer intent from among the one or more library functions;
      generating a request based on the identified library function and the customer intent;
      transmitting the generated request to the enterprise to initiate an interaction;
      receiving a response from the enterprise; and
      notifying the customer of a result of the interaction;
   wherein the personal bot controller circuit is configured to generate the request by:
      identifying one or more arguments to the identified library function, each of the arguments being tagged with a description;
      for a first argument of the one or more arguments, determining that data in the natural language request matches the description corresponding to the first arguments;
      for a second argument of the one or more arguments:
         determining that the natural language request does not include data matching the description corresponding to the second argument;
         in response to determining that the natural language request does not include data matching the description corresponding to the second argument, searching the customer profile storage module and finding therein data matching the description corresponding to the second argument;
generating the request by inserting into the request the data matching the description corresponding to the first argument and the data matching the description corresponding to the second argument.

2. The system of claim 1, wherein the personal bot controller circuit is further configured to generate the request by:
for a third argument of the one or more arguments:
determining that the natural language request does not include data matching the description corresponding to the third argument;
in response to determining that the natural language request does not include data matching the description corresponding to the third argument, prompting the customer, via the user interface, to input data matching the description corresponding to the third argument; and
generating the request by inserting into the request the data matching the description corresponding to the third argument.

3. The system of claim 1, wherein the personal bot controller circuit is further configured to generate the request by:
for a fourth argument of the one or more arguments:
determining that the natural language request does not include data matching the description corresponding to the fourth argument;
in response to determining that the natural language request does not include data matching the description corresponding to the fourth argument, searching for data matching the description corresponding to the fourth argument in an external service associated with the customer, the external service being accessed using a second enterprise library;
in response to determining that the external service comprises data matching the description corresponding to the fourth argument, retrieving the data matching the description corresponding to the fourth argument from the external service using the second enterprise library; and
generating the request by inserting into the request the data matching the description corresponding to the fourth argument.

4. The system of claim 1, wherein the personal bot controller circuit is further configured to conduct an automated interaction by:
determining whether the response from the enterprise indicates that the interaction is complete;
in response to determining that the interaction is complete, determining the result of the interaction based on the response from the enterprise;
in response to determining that the interaction is not complete:
identifying a second library function from the enterprise library for responding to the enterprise;
generating a follow up request based on the response from the enterprise; and
transmitting the follow up request to the enterprise.

5. The system of claim 4, wherein the response from the enterprise comprises a list of options, and
wherein the generating the follow up request comprises:
displaying the list of options on the user interface; and
receiving a user selection from the list of options.

6. The system of claim 1, wherein the enterprise library is generated by:
loading published documentation associated with the API of the enterprise;
parsing the published documentation to identify a plurality of API functions, the published documentation including:
a description of each of the API functions, and
one or more parameters for each of the API functions, each of the one or more parameters being associated with a description;
generating the library functions from corresponding ones of the API functions and the associated descriptions of the API functions, each of the library functions being generated from a corresponding one of the API functions by:
storing an API endpoint for the corresponding API function;
storing the description of the corresponding API function;
identifying the one or more parameters of the corresponding API function; and
storing the one or more descriptions of the one or more parameters of the corresponding API function.

7. The system of claim 1, wherein each of the one or more library functions of the enterprise library is associated with a description, and
wherein the identifying the library function for servicing the customer intent comprises identifying a library function having a corresponding description that is most semantically similar to the customer intent.

8. The system of claim 7, wherein the enterprise library is generated by:
loading published documentation associated with the API of the enterprise;
parsing the published documentation to identify a plurality of API functions, the published documentation including a description of each of the API functions; and
generating each of the one or more library functions from corresponding ones of the API functions and the corresponding descriptions of the API functions.

9. A method for automating interactions with enterprises, the method comprising:
receiving, through a user interface, a natural language request from a customer;
determining a customer intent from the natural language request by supplying the natural language request to a natural language processing engine;
conducting an automated interaction by:
determining, by a personal bot controller circuit, an enterprise to service the customer intent;
loading, by the personal bot controller circuit, an enterprise library for interacting with an application programming interface (API) of the enterprise, the enterprise library comprising one or more library functions;
identifying, by the personal bot controller circuit, a library function for servicing the customer intent from among the one or more library functions;
generating, by the personal bot controller circuit, a request based on the identified library function and the customer intent;
transmitting, by the personal bot controller circuit, the generated request to the enterprise to initiate an interaction;
receiving, by the personal bot controller circuit, a response from the enterprise; and notifying, by the personal bot controller circuit, the customer of a result of the interaction;

wherein the personal bot controller circuit is configured to generate the request by:
- identifying one or more arguments to the identified library function, each of the arguments being tagged with a description;
- for a first argument of the one or more arguments, determining that data in the natural language request matches the description corresponding to the first arguments;
- for a second argument of the one or more arguments:
  - determining that the natural language request does not include data matching the description corresponding to the second argument;
  - in response to determining that the natural language request does not include data matching the description corresponding to the second argument, searching a customer profile storage module and finding therein data matching the description corresponding to the second argument;
- generating the request by inserting into the request the data matching the description corresponding to the first argument and the data matching the description corresponding to the second argument.

10. The method of claim 9, wherein the generating the request comprises:
- for a third argument of the one or more arguments:
  - determining that the natural language request does not include data matching the description corresponding to the third argument;
  - in response to determining that the natural language request does not include data matching the description corresponding to the third argument, prompting the customer, via the user interface, to input data matching the description corresponding to the third argument; and
- generating the request by inserting into the request the data matching the description corresponding to the third argument.

11. The method of claim 9, wherein the generating the request comprises:
- for a fourth argument of the one or more arguments:
  - determining that the natural language request does not include data matching the description corresponding to the fourth argument;
  - in response to determining that the natural language request does not include data matching the description corresponding to the fourth argument, searching for data matching the description corresponding to the fourth argument in an external service associated with the customer, the external service being accessed using a second enterprise library;
  - in response to determining that the external service comprises data matching the description corresponding to the fourth argument, retrieving the data matching the description corresponding to the fourth argument from the external service using the second enterprise library; and
- generating the request by inserting into the request the data matching the description corresponding to the fourth argument.

12. The method of claim 9, further comprising:
- determining whether the response from the enterprise indicates that the interaction is complete;
- in response to determining that the interaction is complete, determining the result of the interaction based on the response from the enterprise;
- in response to determining that the interaction is not complete:
  - identifying a second library function from the enterprise library for responding to the enterprise;
  - generating a follow up request based on the response from the enterprise; and
  - transmitting the follow up request to the enterprise.

13. The method of claim 12, wherein the response from the enterprise comprises a list of options, and
wherein the generating the follow up request comprises:
- displaying the list of options on the user interface; and
- receiving a user selection from the list of options.

14. The method of claim 9, wherein the enterprise library is generated by:
- loading published documentation associated with the API of the enterprise;
- parsing the published documentation to identify a plurality of API functions, the published documentation including:
  - a description of each of the API functions, and
  - one or more parameters for each of the API functions, each of the one or more parameters being associated with a description;
- generating the library functions from corresponding ones of the API functions and the associated descriptions of the API functions, each of the library functions being generated from a corresponding one of the API functions by:
  - storing an API endpoint for the corresponding API function;
  - storing the description of the corresponding API function;
  - identifying the one or more parameters of the corresponding API function; and
  - storing the one or more descriptions of the one or more parameters of the corresponding API function.

15. The method of claim 9, wherein each of the one or more library functions of the enterprise library is associated with a description, and
wherein the identifying the library function for servicing the customer intent comprises identifying a library function having a corresponding description that is most semantically similar to the customer intent.

16. The method of claim 15, wherein the enterprise library is generated by:
- loading published documentation associated with the API of the enterprise;
- parsing the published documentation to identify a plurality of API functions, the published documentation including a description of each of the API functions; and
- generating each of the one or more library functions from corresponding ones of the API functions and the corresponding descriptions of the API functions.

* * * * *